United States Patent
Wang et al.

(10) Patent No.: US 12,511,760 B2
(45) Date of Patent: Dec. 30, 2025

(54) TARGET TRACKING METHOD, TARGET TRACKING APPARATUS, ELECTRONIC DEVICE AND COMPUTER READABLE MEDIUM

(71) Applicant: BOE TECHNOLOGY GROUP CO., LTD., Beijing (CN)

(72) Inventors: Zhen Wang, Beijing (CN); Fei Li, Beijing (CN); Ding Nie, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 328 days.

(21) Appl. No.: 18/034,180

(22) PCT Filed: Apr. 14, 2022

(86) PCT No.: PCT/CN2022/086749
§ 371 (c)(1),
(2) Date: Apr. 27, 2023

(87) PCT Pub. No.: WO2023/197232
PCT Pub. Date: Oct. 19, 2023

(65) Prior Publication Data
US 2024/0320840 A1    Sep. 26, 2024

(51) Int. Cl.
*G06T 7/246* (2017.01)
*G06T 7/70* (2017.01)
(Continued)

(52) U.S. Cl.
CPC ............ *G06T 7/246* (2017.01); *G06T 7/70* (2017.01); *G06V 10/25* (2022.01); *G06V 10/44* (2022.01);
(Continued)

(58) Field of Classification Search
CPC . G06T 7/246; G06T 7/70; G06T 2207/30241; G06V 10/25; G06V 10/44;
(Continued)

(56) References Cited

U.S. PATENT DOCUMENTS

2008/0063236 A1    3/2008  Ikenoue et al.
2021/0089833 A1*   3/2021  Anantha ................ G06N 20/00
(Continued)

FOREIGN PATENT DOCUMENTS

CN    111754545 A    10/2020
CN    112614159 A    4/2021
(Continued)

*Primary Examiner* — Oneal R Mistry
*Assistant Examiner* — Jongbong Nah
(74) *Attorney, Agent, or Firm* — HOUTTEMAN LAW LLC

(57) ABSTRACT

A target tracking method, including: acquiring a video stream of a preset acquisition region; performing target detection on $t^{th}$ video frame of the video stream, and determining a first candidate box of the candidate target in the $t^{th}$ video frame; ranking the candidate targets, according to a confidence of the candidate target and a first intersection over union between the first candidate boxes of respective candidate targets, and determining a candidate target in at least one matched rank; performing at least one matching on the candidate target in the at least one matched rank, respectively, according to a set of trackers of the video stream in $(t-1)^{th}$ state and a preset matching strategy, and determining a target tracking result of the $t^{th}$ video frame; and determining a tracking trajectory of the target in the video stream according to the target tracking results of the T video frames.

18 Claims, 3 Drawing Sheets

(51) Int. Cl.
  *G06V 10/25*    (2022.01)
  *G06V 10/44*    (2022.01)
  *G06V 20/54*    (2022.01)

(52) U.S. Cl.
  CPC .... *G06V 20/54* (2022.01); *G06T 2207/30241* (2013.01); *G06V 2201/07* (2022.01)

(58) Field of Classification Search
  CPC .... G06V 20/54; G06V 2201/07; G06V 10/62; G06V 10/82; G06N 3/04; G06N 3/08
  See application file for complete search history.

(56) References Cited

U.S. PATENT DOCUMENTS

| | | | |
|---|---|---|---|
| 2023/0326036 A1* | 10/2023 | Xiang | G06N 3/0464 382/100 |
| 2023/0370721 A1* | 11/2023 | Horikawa | H04N 23/675 |
| 2024/0037758 A1* | 2/2024 | Jiang | G06V 10/25 |
| 2024/0135710 A1* | 4/2024 | Wu | G06V 10/82 |

FOREIGN PATENT DOCUMENTS

| | | | | |
|---|---|---|---|---|
| CN | 113221750 A | | 8/2021 | |
| CN | 113763427 A | | 12/2021 | |
| CN | 111754545 B | * | 5/2024 | ............. G06T 7/246 |

\* cited by examiner

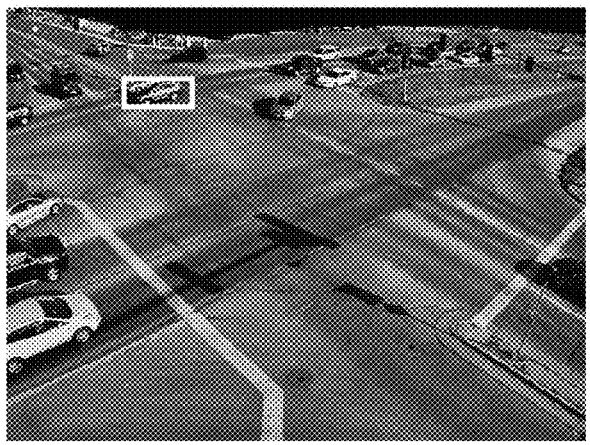
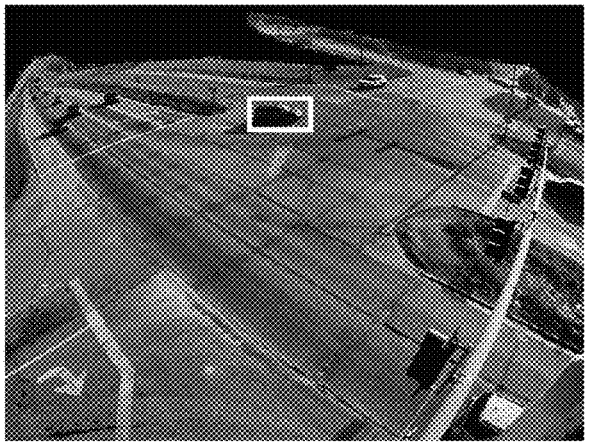
FIG. 1a  FIG. 1b
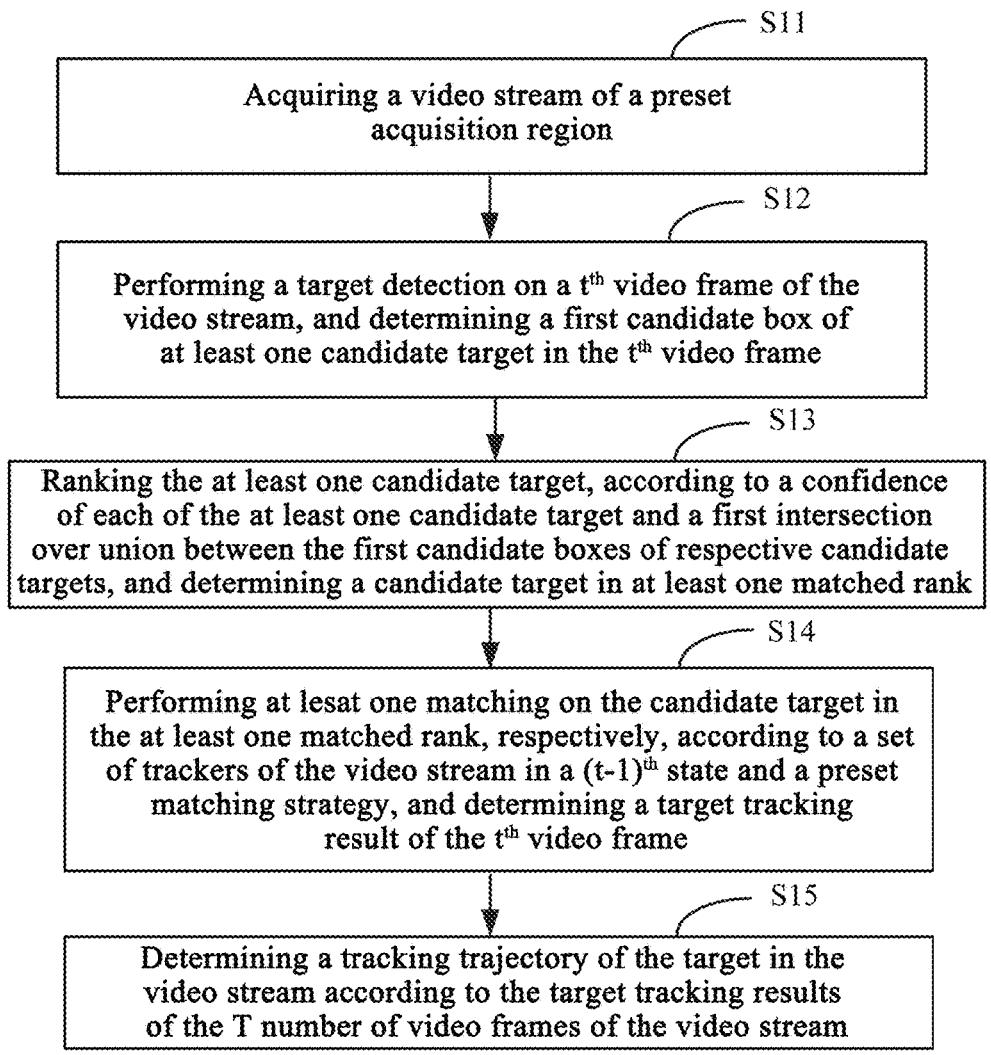
FIG. 2

TARGET TRACKING METHOD, TARGET TRACKING APPARATUS, ELECTRONIC DEVICE AND COMPUTER READABLE MEDIUM

TECHNICAL FIELD

The present disclosure relates to the field of computer technology, and in particular to a target tracking method, a target tracking apparatus, an electronic device and a non-transitory computer readable medium.

BACKGROUND

Target detection and tracking is a very important task in computer vision, which can estimate information of targets (e.g., a vehicle, a person, or an article) within a field of vision, detect and track a single-target or multiple targets within the field of vision through input data of sensors. In the application scenes such as a smart city and traffic analysis, an effect of the target detection and tracking is particularly important. The target tracking method in the related art is prone to be affected by viewing angles, light and crowded targets, has a high risk of losing target, and has a poor effect of target tracking.

SUMMARY

The present disclosure aims to solve at least one technical problem in the prior art and provides a target tracking method, a target tracking apparatus, an electronic device and a non-transitory computer readable medium.

In a first aspect, an embodiment of the present disclosure provides a target tracking method, including:
acquiring a video stream of a preset acquisition region;
performing a target detection on a $t^{th}$ video frame of the video stream, and determining a first candidate box of at least one candidate target in the $t^{th}$ video frame, where t is an integer and $1 < t \leq T$, and T is the number of video frames of the video stream;
ranking the at least one candidate target, according to a confidence of each of the at least one candidate target and a first intersection over union between the first candidate boxes of respective candidate targets, and determining a candidate target in at least one matched rank;
performing at least one matching on the candidate target in the at least one matched rank, respectively, according to a set of trackers of the video stream in a $(t-1)^{th}$ state and a preset matching strategy, and determining a target tracking result of the $t^{th}$ video frame, where the target tracking result includes an identifier and a position of a target in the $t^{th}$ video frame; and
determining a tracking trajectory of the target in the video stream according to the target tracking results of the T number of video frames of the video stream, where the tracking trajectory includes video frames corresponding to the target and positions of the target in the video frames.

In a second aspect, an embodiment of the present disclosure provides a target tracking apparatus, including:
a video stream acquisition module, configured to acquire a video stream of a preset acquisition region;
a target detection module, configured to perform a target detection on a $t^{th}$ video frame of the video stream, and determine a first candidate box of at least one candidate target in the $t^{th}$ video frame, where t is an integer and $1 < t \leq T$, and T is the number of video frames of the video stream;
a target ranking module, configured to rank the at least one candidate target, according to a confidence of each of the at least one candidate target and a first intersection over union between the first candidate boxes of respective candidate targets, and determine a candidate target in at least one matched rank;
a target matching module, configured to perform at least one matching on the candidate target in the at least one matched rank, respectively, according to a set of trackers of the video stream in a $(t-1)^{th}$ state and a preset matching strategy, and determine a target tracking result of the $t^{th}$ video frame; where the target tracking result includes an identifier and a position of a target in the $t^{th}$ video frame; and
a trajectory determination module, configured to determine a tracking trajectory of the target in the video stream according to the target tracking result of the T number of video frames of the video stream, where the tracking trajectory includes video frames corresponding to the target and positions of the target in the video frames.

In a third aspect, an embodiment of the present disclosure provides an electronic device, including:
one or more processors; and
a memory for storing one or more programs which, when being executed by the one or more processors, cause the one or more processors to implement the target tracking method described above.

In a fourth aspect, an embodiment of the present disclosures provides a non-transitory computer readable medium storing a computer program which, when being executed by a processor, implements the target tracking method described above.

BRIEF DESCRIPTION OF DRAWINGS

FIGS. 1a and 1b are schematic diagrams of a same target in different circumstances, respectively.

FIG. 2 is a flowchart of a target tracking method according to an embodiment of the present disclosure.

DETAIL DESCRIPTION OF EMBODIMENTS

Figure 3:
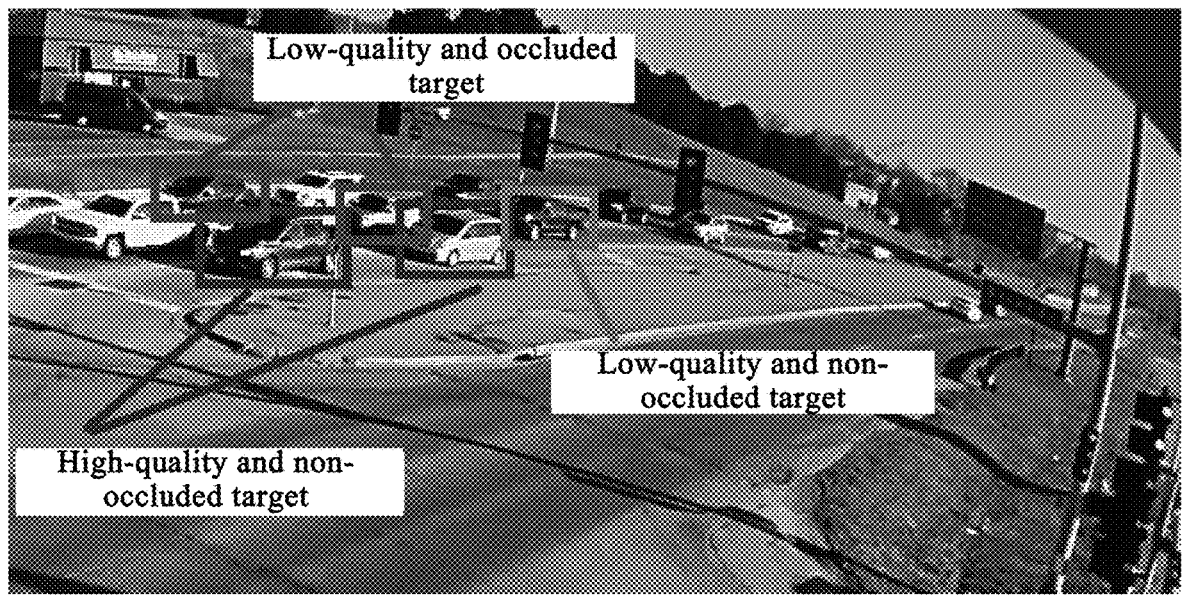
FIG. 3 is a schematic diagram illustrating target ranking according to an embodiment of the present disclosure.

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which the present disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "including", "includes", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the target being described is changed, the relative positional relationships may also be changed accordingly.

In the application scenes such as a smart city and traffic analysis, an effect of a Multi-Target and Multi-Camera tracking (MTMC) is a very important aspect. However, there are still some challenges to overcome. The purpose of cross-camera vehicle tracking is to recognize the same vehicle passing through multiple intersections, but there is a higher risk of losing vehicle due to the fact that the features of cross-intersection camera are prone to be severely affected by viewing angles, light, and crowded vehicles.

FIGS. 1a and 1b are schematic diagrams of a same target in different circumstances, respectively. As shown in FIGS. 1a and 1b, the targets in the white rectangular frames in the figures are the same vehicle, and the success rate of tracking the target in the related art is low due to different angles of different cameras and different light.

The present disclosure provides an efficient and accurate system for multi-target and multi-camera tracking. In a stage of single-camera and multi-target tracking, the present disclosure provides a single-camera and multi-target tracking with multi-rank matching, so that the target detection information is fully utilized, the tracking abnormal results are spliced, and the accuracy and the stability of the tracking results can be improved. In a stage of multi-camera matching, the present disclosure provides a matching strategy based on space-time limitation, so that the matching range is greatly reduced, and the matching accuracy is improved.

FIG. 2 is a flowchart of a target tracking method according to an embodiment of the present disclosure. The target tracking method may be applied to a target tracking apparatus, which may be implemented in software and/or hardware, and can be generally integrated into an electronic device (e.g., a display device). The electronic device may be a terminal device or a server; the terminal device may be a User Equipment (UE), a mobile device, a user terminal, a cellular phone, a cordless phone, a Personal Digital Assistant (PDA), a handheld device, a computing device, a vehicle-mounted device, a wearable device, or the like; and the server may be a cloud server, an edge server, or the like.

As shown in FIG. 2, the target tracking method include the following steps S11 to S15.

Step S11, acquiring a video stream of a preset acquisition region;

Step S12, performing a target detection on a $t^{th}$ video frame of the video stream, and determining at least one first candidate box of at least one candidate target in the $t^{th}$ video frame, where t is an integer and $1 < t \leq T$, and T is the number of video frames of the video stream;

Step S13, ranking the at least one candidate target, according to a confidence of each of the at least one candidate target and a first intersection over union between the first candidate boxes of respective candidate targets, and determining a candidate target in at least one matched rank;

Step S14, performing at least one matching on the candidate target in the at least one matched rank, respectively, according to a set of trackers of the video stream in a $(t-1)^{th}$ state and a preset matching strategy, and determining a target tracking result of the $t^{th}$ video frame, where the target tracking result includes an identifier and a position of a target in the $t^{th}$ video frame; and Step S15, determining a tracking trajectory of the target in the video stream according to the target tracking results of the T number of video frames of the video stream, where the tracking trajectory includes video frames corresponding to the target and positions of the target in the video frames.

For example, the preset acquisition region may be a geographic region corresponding to an image acquired by the camera, such as an intersection, a square, or the like in a city, which is not limited by the present disclosure.

In some embodiments, the video stream of the acquisition region may be acquired in step S11, where the video stream may be a video stream acquired by a camera in real time, or a video stream with a certain time duration acquired in advance, which is not limited by the present disclosure.

In some embodiments, the video stream may include a plurality of video frames, and each of the plurality of video frames has a timestamp for indicating a capture time of the video frame. There may be a certain time interval between any two adjacent video frames, for example, when a frame rate is 20 frames per second, the time interval between any two adjacent video frames is 0.05 second.

In some embodiments, for the $1^{st}$ video frame of the video stream, the target detection may be directly performed on the $1^{st}$ video frame, to determine a detection box of a target in the $1^{st}$ video frame. The $1^{st}$ video frame may be detected with a preset target detection network, and the target detection network may be a convolutional neural network, such as the newest yolov5x6, and the present disclosure does not limit the specific network type of the target detection network.

In some embodiments, the set of trackers of the video stream in the $1^{st}$ state may be created, where the set of trackers includes trackers of targets in the $1^{st}$ video frame, and each tracker includes information such as an identifier, a position, feature information, single-target prediction mode and prediction parameters of the tracked target.

In some embodiments, an identifier ID of the target is used to determine the identity of the target in order to distinguish between different targets. The position of the target may be represented, for example, as coordinates of the diagonal vertices of the detection box of the target in the image, or the coordinates of the top-left vertex of the detection box and a height and a width of the detection box.

In some embodiments, a preset Re-Identification (ReID) network may be used to perform feature extraction on an image of a region corresponding to a detection box of a target, to obtain feature information of the target. The re-identification network may be a residual network, such as ResNet-101, and the specific network type of the re-identification network is not limited by the present disclosure.

In some embodiments, the single-target prediction mode of the target may be set to be at least one mode, for example, including a median optical flow prediction method, an ECO (Efficient Convolution Operators) single-target tracking method, or the like, and the number and specific types of the single-target prediction modes are not limited by the present disclosure.

In some embodiments, the prediction parameters may include prediction parameters (including a predicted speed of the target, etc.) of a Kalman prediction model employed in a multi-target tracking method (e.g., a SORT multi-target tracking algorithm, a DeepSORT multi-target tracking algorithm); and may also be include prediction parameters for each single-target prediction mode. The specific types of prediction parameters and the number of parameters are not limited by the present disclosure.

After the set of trackers of the video stream in the $1^{st}$ state is created, target detection and tracking may be performed on subsequent video frames.

In some embodiments, for any video frame subsequent to the $1^{st}$ video frame (referred to as a $t^{th}$ video frame, t is an integer and $1<t \leq T$, T is the number of video frames of the video stream), in step S12, a target detection network may be used to perform target detection on the $t^{th}$ video frame, to obtain a first candidate box of the candidate target in the $t^{th}$ video frame, i.e., a position of the candidate target in the $t^{th}$ video frame. A confidence of a candidate target may also be determined to represent the probability that the candidate target is a target of a predetermined category (e.g., a vehicle, or a pedestrian).

In some embodiments, in step S13, the candidate targets may be ranked according to the confidences of the candidate targets and the first intersection over union between the first candidate boxes of the respective candidate targets, to determine at least one candidate target in the matched rank. The first intersection over union is a ratio of an intersection region between the first candidate boxes to a union region between the first candidate boxes, and is used to represent a degree of overlapping between the first candidate boxes. The lower the intersection over union (IOU) is, the lower the degree of overlapping is, i.e., the less occlusion between each other is. In contrast, the greater the intersection over union is, the greater the degree of overlapping is, i.e., the greater the occlusion between each other is.

In some embodiments, a confidence threshold and an intersection over union threshold may be set, to rank the candidate targets. For example, a group of a greater confidence threshold and a lower intersection over union threshold is set, and candidate targets meeting the group of thresholds are considered as high-quality and non-occluded targets. A group of a lower confidence threshold and a lower intersection over union threshold is set, and the candidate target meeting the group of thresholds are considered as low-quality and non-occluded targets. A group of a lower confidence threshold and a greater intersection over union threshold is set, and candidate targets that meet the group of thresholds are considered as low-quality and occluded targets. In this way, different matching strategies can be set for different types of targets, so that the targets can be efficiently and accurately matched.

In some embodiments, in step S14, at least one matching may be performed on the candidate target in that least one matched rank, respectively, according to the set of trackers of the video stream in the $(t-1)^{th}$ state and the preset matching strategy, to determine a target tracking result of the $t^{th}$ video frame. For example, a high-quality and non-occluded target can be precisely matched for multiple times, so that the matching accuracy and success rate of the high-quality and non-occluded target are improved. Similarly, different matching strategies may be set for low-quality and non-occluded targets, and low-quality and occluded targets, respectively.

In some embodiments, the target tracking result includes the identifier and position of the target in the $t^{th}$ video frame, and the target in the $t^{th}$ video frame may include a target that is matched among the candidate targets, or a target that is unmatched but is determined to be newly added (newly emerging in the video frame).

In some embodiments, after the matching is completed, strategies such as creation, update, and remediation for trackers in the set of trackers may further be set for targets of different matched ranks, to improve the tracking effect of targets of various ranks.

In some embodiments, the target tracking results of the T number of video frames of the video stream may be obtained by sequentially processing the video frames of the video stream through steps S12-S14. Further, in step S15, a tracking trajectory of the target in the video stream may be determined according to the target tracking results of the T number of video frames of the video stream, where the tracking trajectory includes video frame corresponding to the target and positions of the target in the video frames. Therefore, the processing process of the single-camera and multi-target tracking with multi-rank matching is completed.

According to the embodiment of the present disclosure, it is possible to perform a target detection on the video frame of the video stream, and determine the candidate box of the candidate target in the video frame; rank the candidate targets according to the confidences of the candidate targets and the intersection over union between the candidate boxes, and determine the candidate target in the at least one matched rank; perform a matching on the multiple candidate targets in the matched ranks, according to the set of trackers in a previous state and the preset matching strategy, to determine a target tracking result of the video frame; and determine the tracking trajectory of the target in the video stream, according to the target tracking results of the T number of video frames of the video stream, so that the target detection information can be fully utilized, and the accuracy and the stability of the tracking result are improved.

The target tracking method according to the embodiment of the present disclosure will be described below.

As previously described, the video stream of the acquisition region may be acquired in step S11, and the target detection may be performed on the video frame of the video stream through the target detection network in step S12.

For the $t^{th}$ video frame, in step S12, a target detection network is used to perform target detection on the $t^{th}$ video frame, to obtain a first candidate box of at least one candidate target in the $t^{th}$ video frame, and a confidence of the candidate target may also be determined.

In some embodiments, in step S13, the candidate targets are ranked according to the confidences of the candidate targets and the first intersection over union between the first candidate boxes of the candidate targets, and at least one candidate target in at least one matched rank is determined. For any candidate target, step S13 may include:

Determining a candidate target as a first candidate target in a first matched rank, if the confidence of the candidate target is greater than or equal to a first confidence threshold and a maximum value of the first intersection over union of the candidate target is less than or equal to a first intersection over union threshold;

Determining a candidate target as a second candidate target in a second matched rank, if the confidence of the candidate target is less than the first confidence threshold and greater than or equal to a second confidence threshold, and the maximum value of the first intersection over union of the candidate target is less than or equal to a first intersection over union threshold; and Determining a candidate target as a third candidate target in a third matched rank, if the confidence of the candidate target is less than the first confidence threshold and greater than or equal to the second confidence threshold, and the maximum value of the first intersection over union of the candidate target is greater than the first intersection over union threshold and less than or equal to a second intersection over union threshold.

The first confidence threshold is greater than the second confidence threshold, and the first intersection over union threshold is less than the second intersection over union threshold.

FIG. 3 is a schematic diagram illustrating target ranking according to an embodiment of the present disclosure. As shown in FIG. 3, each rectangular box shows a high-quality and non-occluded target, a low-quality and non-occluded target, or a low-quality and occluded target. It can be seen that the information of the high-quality and non-occluded target is the most accurate, the low-quality and non-occluded target can provide certain information, and the low-quality and occluded target provides the least information, and is prone to cause a mismatching during tracking.

In some embodiments, a group of a greater first confidence threshold and a lower first intersection over union threshold may be set, and candidate targets that meet the group of thresholds are considered as high-quality and non-occluded targets. That is, in a case where the confidence of the candidate target is greater than or equal to the first confidence threshold and the maximum value of the first intersection over union of the candidate target is less than or equal to the first intersection over union threshold, the candidate target is determined as the first candidate target in the first matched rank. For example, the first confidence threshold conf may be set to be 0.3 and the first intersection over union threshold may be set to be 0.3. The specific values of the first confidence threshold and the first intersection over union threshold are not limited by the present disclosure.

The maximum value of the first intersection over unions between the candidate target and the other candidate targets may represent the candidate target with the maximum degree of overlapping with the candidate target in the other candidate targets. If the intersection over union corresponding to the candidate target with the maximum degree of overlapping is still lower, the candidate target is represented to be free of occlusion.

In some embodiments, a group of a lower second confidence threshold and a lower first intersection over union threshold may be set, and candidate targets that meet the group of thresholds are considered low-quality and non-occluded targets. That is, in a case where the confidence of the candidate target is less than the first confidence threshold and greater than or equal to the second confidence threshold, and the maximum value of the first intersection over union of the candidate target is less than or equal to the first intersection over union threshold, the candidate target is determined as the second candidate target in the second matched rank. For example, the second confidence threshold conf may be set to be 0.1. The specific value of the second confidence threshold is not limited by the present disclosure.

The first confidence threshold (e.g., 0.3) is greater than the second confidence threshold (e.g., 0.1). The candidate target with the confidence less than the second confidence threshold may be considered as an invalid target, which is not subsequently processed or directly deleted.

In some embodiments, a group of a lower confidence threshold and a greater intersection over union threshold may be set, and candidate targets that meet the group of thresholds are considered low-quality and occluded targets. That is, in a case where the confidence of the candidate target is less than the first confidence threshold and greater than or equal to the second confidence threshold, and the maximum value of the first intersection over union of the candidate target is greater than the first intersection over union threshold and less than or equal to the second intersection over union threshold, the candidate target is determined as the third candidate target in the third matched rank. For example, the second intersection over union threshold may be set to be 0.45. The specific value of the second intersection over union threshold is not limited by the present disclosure.

The first intersection over union threshold (e.g., 0.3) is less than the second intersection over union threshold (e.g., 0.45). The candidate target with the intersection over union greater than the second intersection over union threshold may be considered an invalid target, which is not subsequently processed or directly deleted.

In this way, different matching strategies may be set for different types of targets, so that a matching can be efficiently and accurately performed on the targets. For example, when 10 candidate targets are included in the $t^{th}$ video frame, it may be determined that the numbers of candidate targets in the first matched rank, the second matched rank, and the third matched rank are 3, 3, and 4, respectively.

In some embodiments, after the ranking in step S13, multi-rank matching may be performed in step S14, a matching is performed on each of the at least one candidate target in the at least one matched rank according to the set of trackers of the video stream in the $(t-1)^{th}$ state and a preset matching strategy, and the target tracking result of the $t^{th}$ video frame is determined.

In some embodiments, when the processing on the $(t-1)^{th}$ video frame is completed, the set of trackers of the $(t-1)^{th}$ state may be obtained through updating, and the set of trackers of the $(t-1)^{th}$ state includes at least one of a first tracker of a first history target matched in the $(t-1)^{th}$ video frame and a second tracker of a second history target unmatched in the $(t-1)^{th}$ video frame.

The first history target matched in the $(t-1)^{th}$ video frame may include a target which is not lost in the $(t-1)^{th}$ video frame and a target newly added in the $(t-1)^{th}$ video frame. The second history target unmatched in the $(t-1)^{th}$ video frame may include a target that is lost in the $(t-1)^{th}$ video frame but has not been deleted (which is possibly be deleted after several consecutive frames where the target is lost).

In some embodiments, four matchings (four times of matching) may be performed sequentially in terms of four matched ranks, to realize target tracking. The step S14 may include the following steps S1411 to S1415.

Step S1411, performing a feature extraction on the first candidate target, to obtain first feature information of the first candidate target;

Step S1412, determining a first prediction box of the first history target in the $t^{th}$ video frame with a corresponding single-target prediction mode, according to the first tracker of the first history target;

Step S1413, determining a first loss matrix between the first history target and the first candidate target, according to the first feature information of the first candidate target, the first candidate box of the first candidate target, and the first prediction box of the first history target in the $t^{th}$ video frame;

Step S1414, determining a first matching result between the first history target and the first candidate target according to the first loss matrix, where the first matching result includes at least one of the first candidate target in the first matched rank that is matched, the first candidate target in the first matched rank that is unmatched, and the first history target that is unmatched; and Step S1415, for the first candidate target matched in the first matching result, determining the first candidate target as a target in the $t^{th}$ video frame, where an identifier of the target is an identifier of the first history target matched with the target, and a position of the target is a position of the first candidate box of the target.

For example, an accurate matching may first be performed between the high-quality and non-occluded candidate target (the first candidate target in the first match rank) and the first history target matched in the $(t-1)^{th}$ video frame.

In some embodiments, in step S1411, a re-identification network may be used to perform feature extraction on an image (extract features from an image) of a region corresponding to a candidate box of a first candidate target in a $t^{th}$ frame of a video frame, to obtain the feature information (referred to as first feature information) of the target. In this way, only the features of the high-quality and non-occluded candidate targets can be extracted, so that the extracted features are more accurate, the matching precision is improved, the mismatching probability is reduced, the number of the candidate targets with the features to be extracted can be reduced, and the calculation amount can be reduced.

In some embodiments, in step S1412, according to the single-target prediction mode and the corresponding prediction parameters in the first tracker, single-target prediction is performed on each first history target, to obtain a first prediction box of the first history target in the $t^{th}$ video frame. For example, when a median optical flow prediction method and an ECO single-target tracking method are employed, two first prediction boxes of the first history target are obtained according to the two methods.

In some embodiments, in step S1413, the first loss matrix between the first history target and the first candidate target may be determined according to the first feature information of the first candidate target, the first candidate box of the first candidate target, and the first prediction box of the first history target in the $t^{th}$ video frame. The step S1413 may include:

Determining a first feature distance matrix according to first feature information of the first candidate target and the feature information of the first history target;

Determining a first intersection over union distance matrix according to the first candidate box of the first candidate target and the first prediction box of the first history target in the tth video frame; and Determining the first loss matrix, according to the first feature distance matrix and the first intersection over union distance matrix.

That is, a feature distance, such as a feature cosine distance, between the first feature information of each first candidate target and the feature information of every first history target may be calculated, to obtain the first feature distance matrix. For example, when the number of the first candidate targets is 3 and the number of the first history targets is 4, a first feature distance matrix of 3×4 may be obtained.

In some embodiments, the intersection over union between the first candidate box of each first candidate target and the first prediction box of every first history target may be calculated, to obtain the first intersection over union distance matrix. For example, when the number of the first candidate targets is 3 and the number of the first history targets is 4, a first intersection over union distance matrix of 3×4 may be obtained. The specific manner in which the first intersection over union distance matrix is calculated is not limited by the present disclosure.

In some embodiments, the prediction mode of the first history target includes at least one single-target prediction mode, and the first intersection over union distance matrix correspondingly includes at least one intersection over union distance matrix. In a case where a plurality of single-target prediction modes are employed, a plurality of first intersection over union distance matrixes may be obtained, respectively.

In some embodiments, the first loss matrix M1 may be determined based on the first feature distance matrix and the first intersection over union distance matrix. M1 is expressed, for example, as:

$$M1=\alpha 1 \times A1+\beta 1 \times B1+\gamma 1 \times C1 \qquad (1).$$

In formula (1), A1 represents a first feature distance matrix, B1 represents a first intersection over union distance matrix obtained by the median optical flow prediction method, C1 represents a first intersection over union distance matrix obtained by the ECO single-target tracking method, and $\alpha 1$, $\beta 1$, and $\gamma 1$ represent weights of A1, B1, and C1, respectively. The weights $\alpha 1$, $\beta 1$, and $\gamma 1$ may be normalized, i.e., $\alpha 1+\beta 1+\gamma 1=1$; the weights may alternatively not be normalized, which is not limited by the present disclosure. It should be understood that the specific values of the weights $\alpha 1$, $\beta 1$, and $\gamma 1$ may be set by one of ordinary skill in the art according to practical situations, and are not limited by the present disclosure.

In some embodiments, in step S1414, the first matching result between the first history target and the first candidate target may be determined according to the first loss matrix, and the first matching result includes at least one of the first candidate target in the first matched rank that is matched, the first candidate target in the first matched rank that is unmatched, and the first history target that is unmatched.

A first distance threshold may be set. If an element in the first loss matrix is less than or equal to the first distance threshold, it may be considered that the corresponding first history target and the first candidate target are matched with each other. If an element in the first loss matrix is greater than the first distance threshold, it may be considered that the corresponding first history target and the first candidate target are unmatched with each other. In this way, through the matching processing, at least one of a pair of targets consisting of the first history target and the first candidate target which are matched with each other, the first candidate target which is unmatched, and the first history target which is unmatched can be obtained. That is, the first matching result can be obtained.

The specific value of the first distance threshold is not limited by the present disclosure.

In some embodiments, in step S1415, for a first candidate target that is successfully matched in the first matching result, the first candidate target may be determined as a target in the $t^{th}$ video frame, where an identifier of this target is an identifier ID of the first history target matched with the target, and is used to represent the same target; and a position of the target is a position of the first candidate box of the target.

In this way, an accurate matching between the high-quality and non-occluded candidate target and the history target matched in a previous frame can be realized, and the matching accuracy can be improved.

In some embodiments, after the first matching, if there are a first candidate target unmatched and a first history target unmatched in the first matching result, a matching may be performed again between the first candidate target and the first history target unmatched in the first matching.

In some embodiments, step S14 may further include the following steps S1421 to S1426.

Step S1421, determining a second prediction box of the third history target in the $t^{th}$ video frame, through predicting with a Kalman prediction model, according to a prediction parameter of a third history target, where the third history target is the first history target unmatched in the first matching result;

Step S1422, determining a second intersection over union distance matrix according to a first candidate box of a fourth candidate target and the second prediction box of the third history target, where the fourth candidate target is the first candidate target unmatched in the first matching result;

Step S1423, determining a third intersection over union distance matrix according to the first candidate box of the fourth candidate target and the first prediction box of the third history target in the $t^{th}$ video frame;

Step S1424, determining a second loss matrix according to the second intersection over union distance matrix and the third intersection over union distance matrix;

Step S1425, determining a second matching result between the fourth candidate target and the third history target according to the second loss matrix, where the second matching result includes at least one of the fourth candidate target that is matched, the fourth candidate target that is unmatched, and the third history target that is unmatched; and Step S1426, for the fourth candidate target matched in the second matching result, determining the fourth candidate target as a target in the $t^{th}$ video frame, where an identifier of this target is an identifier of the matched third history target, and a position of the target is a position of the first candidate box of the target.

For example, the first history target unmatched in the first matching result may be referred to as a third history target, and the first candidate target unmatched in the first matching result may be referred to as a fourth candidate target, for easy differentiation.

In some embodiments, in step S1421, according to the first tracker of the third history target, the prediction parameter of the Kalman prediction model may be obtained; and a prediction is performed through the Kalman prediction model, and the second prediction box of the third history target in the $t^{th}$ video frame may be determined. The particular prediction process is not limited by the present disclosure.

In some embodiments, in step S1422, the second intersection over union distance matrix is determined according to the first candidate box of the fourth candidate target and the second prediction box of the third history target. The specific calculation method of the second intersection over union distance matrix is not limited by the present disclosure.

In some embodiments, in step S1423, the third intersection over union distance matrix is determined according to the first candidate box of the fourth candidate target and the first prediction box of the third history target in the $t^{th}$ video frame (obtained in the above step S1412). Similarly, in a case where a plurality single-target prediction modes are employed, a plurality of third intersection over union distance matrices may be obtained, respectively. The specific calculation method of the third intersection over union distance matrix is not limited by the present disclosure.

In some embodiments, in step S1424, the second loss matrix M2 is determined according to the second intersection over union distance matrix and the third intersection over union distance matrix. M2 is expressed, for example, as:

$$M2 = \alpha 2 \times P1 + \beta 2 \times B2 + \gamma 2 \times C2 \qquad (2).$$

In formula (2), P1 represents the second intersection over union distance matrix, B2 represents the third intersection over union distance matrix obtained by the median optical flow prediction method, C2 represents the third intersection over union distance matrix obtained by the ECO single-target tracking method, and $\alpha 2$, $\beta 2$, and $\gamma 2$ represent weights of P, B2 and C2, respectively. The weights $\alpha 2$, $\beta 2$, $\gamma 2$ may be normalized, i.e., a $2+\beta 2+\gamma 2=1$; the weights may alternatively not be normalized, which is not limited by the present disclosure. It should be understood that the specific values of the weights $\alpha 2$, $\beta 2$, and $\gamma 2$ may be set by one of ordinary skill in the art according to practical situations, and are not limited by the present disclosure.

In some embodiments, in step S1425, the second matching result between the fourth candidate target and the third history target may be determined according to the second loss matrix, where the second matching result includes at least one of the fourth candidate target that is matched, the fourth candidate target that is unmatched, and the third history target that is unmatched.

A second distance threshold may be set. If an element in the second loss matrix is less than or equal to the second distance threshold, it may be considered that the corresponding fourth candidate target and the third history target are matched with each other. If an element in the second loss matrix is greater than the second distance threshold, it may be considered that the corresponding fourth candidate target and the third history target are unmatched with each other. In this way, through the matching processing, at least one of a pair of targets consisting of the fourth candidate target and the third history target which are matched with each other, the fourth candidate target which is unmatched, and the third history target which is unmatched can be obtained.

That is, the second matching result can be obtained.

The second distance threshold may be different from the above first distance threshold. The specific value of the second distance threshold is not limited by the present disclosure.

In some embodiments, in step S1426, for the fourth candidate target matched in the second matching result, the fourth candidate target is determined as a target in the $t^{th}$ video frame, where an identifier of the target is an identifier ID of the matched third history target, and is used to represent the same target; and a position of the target is a position of the first candidate box of the target.

In this way, on the basis of the first matching, a second matching between the high-quality and non-occluded candidate target unmatched in the first matching and the history target matched in the previous frame can be realized, and the matching precision and success rate can be further improved.

In some embodiments, after the second matching, if there is the fourth candidate target unmatched (the high-quality and non-occluded candidate target unmatched) in the second matching result, a matching may be performed between the fourth candidate target unmatched and the second history target unmatched (a tracker of tracking that has been lost) in the $(t-1)^{th}$ video frame, that is, a third matching may be performed, to perform a matching remediation for the history target that is unmatched in the previous one or more frames. A possible case may be that the history target is occluded and lost, and may re-appear in a subsequent frame.

In some embodiments, step S14 may further include the following steps S1431 to S1433.

Step S1431, determining a second feature distance matrix according to a first feature information of a fifth candidate target and the feature information of the second history target, where the fifth candidate target is the fourth candidate target unmatched in the second matching result;

Step S1432, determining a third matching result between the fifth candidate target and the second history target, according to the second feature distance matrix, where the third matching result includes at least one of the fifth candidate target matched, the fifth candidate target unmatched, and the second history target unmatched; and Step S1433, for the fifth candidate target matched in the third matching result, determining the fifth candidate target as the target in the $t^{th}$ video frame, where an identifier of the target is an identifier of the second history target matched with the target, and a position of the target is a position of the first candidate box of the target.

For example, the fourth candidate target unmatched in the second matching result (i.e., the first candidate target unmatched in both the first matching the second matching) may be referred to as the fifth candidate target, for easy differentiation.

In some embodiments, in step S1431, the second feature distance matrix is determined according to the first feature information of the fifth candidate target and the feature information of the second history target. A feature distance, such as a feature cosine distance, between the first feature information of each fifth candidate target and the feature information of every second history target may be calculated, to obtain the second feature distance matrix A2.

In some embodiments, in the case of matching remediation, only the feature distance may be employed for the determination. That is, the second feature distance matrix is taken directly as the loss matrix M=A2. In step S1432, the third matching result between the fifth candidate target and the second history target is determined according to the second feature distance matrix, where the third matching result includes at least one of the fifth candidate target matched, the fifth candidate target unmatched, and the second history target unmatched.

In some embodiments, similarly, a third distance threshold may be set. If an element in the second feature distance matrix is less than or equal to the third distance threshold, it may be considered that the corresponding fifth candidate target and the second history target are matched with each other. If an element in the second feature distance matrix is greater than the third distance threshold, it may be considered that the corresponding fifth candidate target and the second history target are unmatched with each other. In this way, through the matching processing, at least one of a pair of targets consisting of the matched fifth candidate target and the second history target, the fifth candidate target unmatched, and the second history target unmatched can be obtained. That is, the third matching result can be obtained.

The third distance threshold may be different from both the above first and second distance thresholds. The specific value of the third distance threshold is not limited by the present disclosure.

In some embodiments, in step S1433, for the fifth candidate target matched in the third matching result, the fifth candidate target is determined as the target in the $t^{th}$ video frame, where an identifier of the target is an identifier of the matched second history target, and is used to represent the same target; and a position of the target is a position of the first candidate box of the target.

In this way, on the basis of the second matching, a matching remediation may be performed between the high-quality and non-occluded candidate target unmatched in the second matching and the second history target (the tracker of lost tracking), so that the success rate of matching is further improved.

In some embodiments, after three matchings, if there is still a history target unmatched (which may also be referred to as there is still a tracker unmatched), a fourth matching may be performed between the history target unmatched and the low-quality and non-occluded candidate and the low-quality and occluded candidate. The manner of the fourth matching may be similar to the manner of the second matching.

In some embodiments, step S14 may further include the following steps S1441 to S1445.

Step S1441, determining a third prediction box of a fourth history target in the $t^{th}$ video frame, through predicting with a Kalman prediction model, according to a prediction parameter of the fourth history target, where the fourth history target includes the third history target unmatched in the second matching result and the second history target unmatched in the third matching result;

Step S1442, determining a fourth prediction box of the fourth history target in the $t^{th}$ video frame, according to the single-target prediction mode of the fourth history target;

Step S1443, determining a third loss matrix according to the first candidate box of a sixth candidate target and the third prediction box and the fourth prediction box of the fourth history target, where the sixth candidate target includes the second candidate target and the third candidate target;

Step S1444, determining a fourth matching result between the sixth candidate target and the fourth history target according to the third loss matrix, where the fourth matching result includes at least one of the sixth candidate target matched, the sixth candidate target unmatched, and the fourth history target unmatched; and Step S1445, for the sixth candidate target matched in the fourth matching result, determining the sixth candidate target as a target in the $t^{th}$ video frame, where an identifier of this target is an identifier of the fourth history target matched, and a position of the target is a position of the first candidate box of this target.

For example, it is possible to set a fourth history target, including the third history target unmatched in the second matching result and the second history target unmatched in the third matching result; and it is also possible to further set a sixth candidate target, including the (low-quality and non-occluded) second candidate target and the (low-quality and occlusion) third candidate target, for easy differentiation.

In some embodiments, in step S1441, the prediction parameter of the Kalman prediction model may be obtained according to the tracker of the fourth history target, and the third prediction box of the fourth history target in the $t^{th}$ video frame is determined through predicting with the Kalman prediction model. The particular prediction process is not limited by the present disclosure.

In some embodiments, in step S1442, the fourth prediction box of the fourth history target in the $t^{th}$ video frame is determined according to a single-target prediction mode of the fourth history target. The particular prediction process is not limited by the present disclosure.

In some embodiments, in step S1443, the third loss matrix is determined according to the first candidate box of the sixth candidate target and the third prediction box and the fourth prediction box of the fourth history target. That is, an intersection over union distance matrix is determined according to the first candidate box and the third prediction box; and an intersection over union distance matrix is determined according to the first candidate box and the fourth prediction box, where the number of the intersection over union distance matrixes corresponds to the number of the single-target prediction modes; and a third loss matrix is obtained according to a weighted sum of the intersection over union distance matrixes. The third loss matrix is represented similar to formula (2), and is not repeated herein.

In some embodiments, in step S1444, the fourth matching result between the sixth candidate target and the fourth history target is determined according to the third loss matrix, and the fourth matching result includes at least one of the sixth candidate target matched, the sixth candidate target unmatched, and the fourth history target unmatched.

In some embodiments, similarly, a fourth distance threshold may be set. Through the matching process, at least one of a pair of targets consisting of the sixth candidate target and the fourth history target which are matched with each other, the sixth candidate target which is unmatched, and the fourth history target which is unmatched is obtained. That is, the fourth matching result is obtained.

In some embodiments, in step S1445, for the sixth candidate target that is matched in the fourth matching result, the sixth candidate target is determined as the target in the $t^{th}$ video frame, where an identifier of the target is an identifier of the matched fourth history target, and is used to represent the same target; and a position of the target is a position of the first candidate box of the target.

In this way, the fourth matching between the low-quality and non-occluded candidate target and trackers of all the remaining history targets can be realized on the basis of the previous three matchings, and the success rate of matching can be further improved.

In some embodiments, after the previous three matchings described above, if there is still a first candidate target unmatched, the target may be considered as a new emerging target.

In some embodiments, step S14 may further include the following step S1451.

Step S1451, for the fifth candidate target unmatched in the third matching result, determining the fifth candidate target as the target in the $t^{th}$ video frame, where an identifier of the target is a newly created identifier, and a position of the target is a position of the first candidate box of the target.

That is to say, the fifth candidate target unmatched in the third matching result may be directly determined as the target in the $t^{th}$ video frame, and a new identifier is created for the target, to represent a new target and distinguish the new target from the existing target; and the position of the target is the position of the first candidate box of the target.

Thus, the whole matching process of step S14 is completed, and a final target tracking result of the $t^{th}$ video frame is obtained, where the target tracking result includes the identifiers and positions of all the targets in the $t^{th}$ video frame determined in the previous steps.

In some embodiments, after the target tracking result of the $t^{th}$ video frame is obtained, creation, update, remediation and the like may be performed on each tracker in the set of trackers in the $(t-1)^{th}$ state according to the situation, to obtain the set of trackers in the $t^{th}$ state, so that the set of trackers in the $t^{th}$ state is used continuously when the next frame (the $(t+1)^{th}$ frame) is processed.

In some embodiments, subsequent to step S14, the method further includes:

Creating a first tracker of the target in the set of trackers, where the first tracker of the target includes the identifier, the position and the feature information, the single-target prediction mode, and the prediction parameters of the target.

For example, if there is still a candidate box unmatched after the above three matchings, it can be considered that a new high-quality and non-occluded target enters the field of vision and appears in the $t^{th}$ frame image. In this case, a first tracker of the target may be created in the set of trackers based on the candidate box of the target, and the first tracker includes the identifier, the position, the feature information, the single-target prediction mode, the prediction parameters, and the like of the target. In this case, the Kalman prediction model may be initialized, the prediction parameter of the respective single-target prediction mode may be initialized, an optical flow point sampling may be performed, and the feature information of the target may be extracted through the re-identification network and stored.

In this way, a tracker of the new target can be created for subsequent processing.

In some embodiments, the tracker of each target matched in the previous four matchings may be updated.

In some embodiments, subsequent to step S14, the method further includes:

Determining a seventh candidate target, where the seventh candidate target includes the first candidate target matched in the first matching result, the fourth candidate target matched in the second matching result, the fifth candidate target matched in the third matching result, and the sixth candidate target matched in the fourth matching result; and Updating the tracker of the seventh candidate target according to the position of the seventh candidate target.

That is, it is possible to set a seventh candidate target, including the first candidate target matched in the first matching result, the fourth candidate target matched in the second matching result, the fifth candidate target matched in the third matching result, and the sixth candidate target matched in the fourth matching result, that is, all targets matched in the previous four matchings. The tracker of each seventh candidate target is updated according to the position of the candidate box of the seventh candidate target.

In some embodiments, the step of updating the tracker of the seventh candidate target includes:

Updating the prediction parameter of a Kalman prediction model in the tracker of the seventh candidate target according to the position of the seventh candidate target;

For a single-target prediction mode of the seventh candidate target, determining a second intersection over union between the candidate box of the seventh candidate target and a prediction box determined with the single-target prediction mode;

Initializing the prediction parameter corresponding to the single-target prediction mode, if the second intersection over union is greater than the third intersection over union threshold; and Updating the prediction parameter corresponding to the single-target prediction mode according to the position of the seventh candidate target, if the second intersection over union is less than or equal to the third intersection over union threshold.

For example, the parameter is updated for all the seventh candidate targets.

In some embodiments, the prediction parameter of the Kalman prediction model in the respective tracker, such as the prediction speed in the Kalman prediction model, or the like, may be updated, according to the position of the corresponding seventh candidate target in the previous one or more frames and the position of the seventh candidate target in the $t^{th}$ frame, in order to improve the accuracy of the subsequent prediction.

In some embodiments, for the single-target prediction mode of each seventh candidate target, it may be firstly determined whether the single-target prediction shifts.

The second intersection over union between the candidate box of the seventh candidate target and the prediction box determined by the corresponding single-target prediction mode may be determined. If the second intersection over union is greater than a preset third intersection over union threshold, the single-target prediction is considered to shift. In this case, the prediction parameter corresponding to the single-target prediction mode may be initialized. For example, various information used for prediction is completely updated with the image of the region in the $t^{th}$ video frame corresponding to the candidate box, so that the initialization is realized.

In some embodiments, if the second intersection over union is less than or equal to a preset third intersection over union threshold, the single-target prediction may be considered to not shift. In this case, the prediction parameter corresponding to the single-target prediction mode may be updated in a conventional manner. For example, various information used for prediction is partially updated with the image of the region in the $t^{th}$ video frame corresponding to the candidate box.

In this way, the accuracy and the effectiveness of parameter updating can be improved, and the precision of target tracking prediction of the subsequent video frame can be improved.

In some embodiments, feature information (re-identified features) in the tracker may be updated for the high-quality and non-occluded target and the low-quality and non-occluded target. For the low-quality and occluded target, if the feature information (re-identified features) in the tracker is updated, the subsequent processing may be inaccurate or even mismatching may occur, so that the feature information is not required to be updated.

In some embodiments, the step of updating the tracker of the seventh candidate target further includes:

For the first candidate target in the seventh candidate targets, updating the feature information in the tracker of the first candidate target according to the first feature information of the first candidate target;

Performing feature extraction on the second candidate target in the seventh candidate targets to obtain second feature information of the second candidate target; and Updating the feature information in the tracker of the second candidate target, according to the second feature information.

That is, for the first candidate target (the high-quality and non-occluded target) in the seventh candidate targets, the first feature information has been obtained in the previous step S1411. In this case, the feature information in the tracker of the first candidate target may be directly updated according to the first feature information of the first candidate target.

In some embodiments, for the second candidate target (the low-quality and non-occluded target) in the seventh candidate targets, in the current step, the re-identification network may be used to perform feature extraction on an image of a region corresponding to the candidate box of the second candidate target in the $t^{th}$ video frame, to obtain the second feature information of the second candidate target. Then, the feature information in the tracker of the second candidate target is updated according to the second feature information.

In this way, the re-identification features in the trackers of the high-quality and non-occluded target and the low-quality and non-occluded target can be updated, so that the accuracy of target tracking prediction of the subsequent video frame can be improved.

In some embodiments, subsequent to step S14, the method further includes:

For the fourth history target unmatched in the fourth matching result, updating the prediction parameter of the Kalman prediction model in the tracker of the fourth history target according to the position of the fourth prediction box of the fourth history target.

That is, for the history target that is unmatched after four matchings (fourth history target that has unmatched), the number of frames, where the tracker of the fourth history target is lost, may be determined (the number of frames, where the tracker is lost, is set to be 1, if the tracker begins to be lost is the current $t^{th}$ frame). If the number of frames, where the tracker is lost, reaches a preset frame number threshold (for example, 5 frames), it is considered that the fourth history target has left from the acquisition region, and the tracker of the fourth history target is deleted.

In some embodiments, if the number of frames, where the tracker is lost, has not reached the preset frame number threshold, the tracker of the fourth history target may be remedied. The prediction parameter of the Kalman prediction model in the tracker of the fourth history target is updated according to the position of the fourth prediction box of the fourth history target obtained with the single-target prediction mode, to continuously perform tracking prediction through the Kalman prediction model.

In this way, the stability of the tracker can be improved when the detection result flickers (disappears for several frames), thereby improving the accuracy of target tracking prediction.

Through the above processing, the whole process of creating, updating, remedying and deleting each tracker in the set of trackers in the $(t-1)^{th}$ state is completed, and the set of trackers in the $t^{th}$ state is obtained, to be continuously used when the next frame (the $(t+1)^{th}$ frame) is processed. When the video frame of the $(t+1)^{th}$ frame is processed, the target corresponding to each tracker in the set of trackers in the $t^{th}$ state can be used as a history target, to be performed a matching together with the candidate target detected in the $(t+1)^{th}$ video frame.

In some embodiments, the target tracking results of the T number of video frames of the video stream may be obtained by sequentially processing the respective video frames of the video stream through steps S12-S14. Further, in step S15, a tracking trajectory of the target in the video stream may be determined according to the target tracking results of the T number of video frames of the video stream, where the tracking trajectory includes video frames corresponding to the target and positions of the target in the video frames. Therefore, the processing of single-camera and multi-target tracking with multi-rank matching is completed.

According to the embodiment of the present disclosure, a matching between the tracking trajectories of the video streams of the plurality of cameras can be realized. In some embodiments, a plurality of preset acquisition regions may be provided, and the video streams of respective acquisition regions may be acquired by a plurality of cameras, respectively, to obtain video streams of the plurality of acquisition regions.

In some embodiments, after determining the tracking trajectory of the target in the video stream in step S15, the method further includes the following steps S16 to S19.

Step S16, grouping the targets in terms of the spatial correlation among the tracking trajectories, according to the geographic locations of the plurality of acquisition regions and the tracking trajectories of the target in the video streams of the plurality of acquisition regions, to obtain a plurality of spatial groups, where each of the plurality of spatial groups includes at least one target and the tracking trajectories of the target;

Step S17, for any one spatial group, grouping the targets in the spatial group, according to a start moment and an end moment of the tracking trajectory of the target in the spatial group and a range of duration for passing through a region between the acquisition regions where the target is located, to obtain a plurality of temporal sub-groups;

Step S18, clustering the tracking trajectories of the targets in a respective temporal sub-group, to obtain a trajectory matching result of the spatial group, where the trajectory matching result includes the tracking trajectories belonging to a same target in video streams of different acquisition regions; and Step S19, determining a trajectory matching result of the video streams of the plurality of acquisition regions, according to the trajectory matching results of the plurality of spatial groups.

For example, in the multi-camera matching, after the tracking trajectory of the target in the video stream of the acquisition region of each single camera is obtained, the trajectories of the same vehicle of the plurality of cameras are matched according to the features and other information of the target, so that the effect of cross-camera tracking is realized.

In some embodiments, spatial correlation and temporal correlation between the tracking trajectories may be used to filter the respective tracking trajectories, in order to improve the accuracy of subsequent trajectory matching.

In some embodiments, in step S16, the targets are grouped in terms of spatial correlation among tracking trajectories, according to the geographic locations of the plurality of acquisition regions and the tracking trajectories of the targets in the video streams of the plurality of acquisition regions, to obtain the plurality of spatial groups. For example, for two geographically adjacent acquisition regions, spatially correlated target tracking trajectories of the two acquisition regions may be divided into two groups, one group includes targets entering a second acquisition region from a first acquisition region, and the other group includes targets entering the first acquisition region from the second acquisition region. Therefore, two targets with opposite trajectory directions can be prevented from participating in subsequent clustering, so that the error rate of matching can be reduced.

In some embodiments, step S16 may include:

Determining a first spatial group and a second spatial group, according to geographic locations of a first acquisition region and a second acquisition region and tracking trajectories of targets in video streams of the first acquisition region and the second acquisition region.

The first acquisition region and the second acquisition region are any two adjacent acquisition regions of the plurality of acquisition regions.

The first spatial group includes targets entering the second acquisition region from the first acquisition region, and the second spatial group includes targets entering the first acquisition region from the second acquisition region.

For example, for any two adjacent acquisition regions of the plurality of acquisition regions, which are referred to as a first acquisition region and a second acquisition region, respectively, the first spatial group and the second spatial group may be determined according to the geographic locations of the first acquisition region and the second acquisition region and the tracking trajectories of the target in the video streams of the first acquisition region and the second acquisition region.

Figure 4:
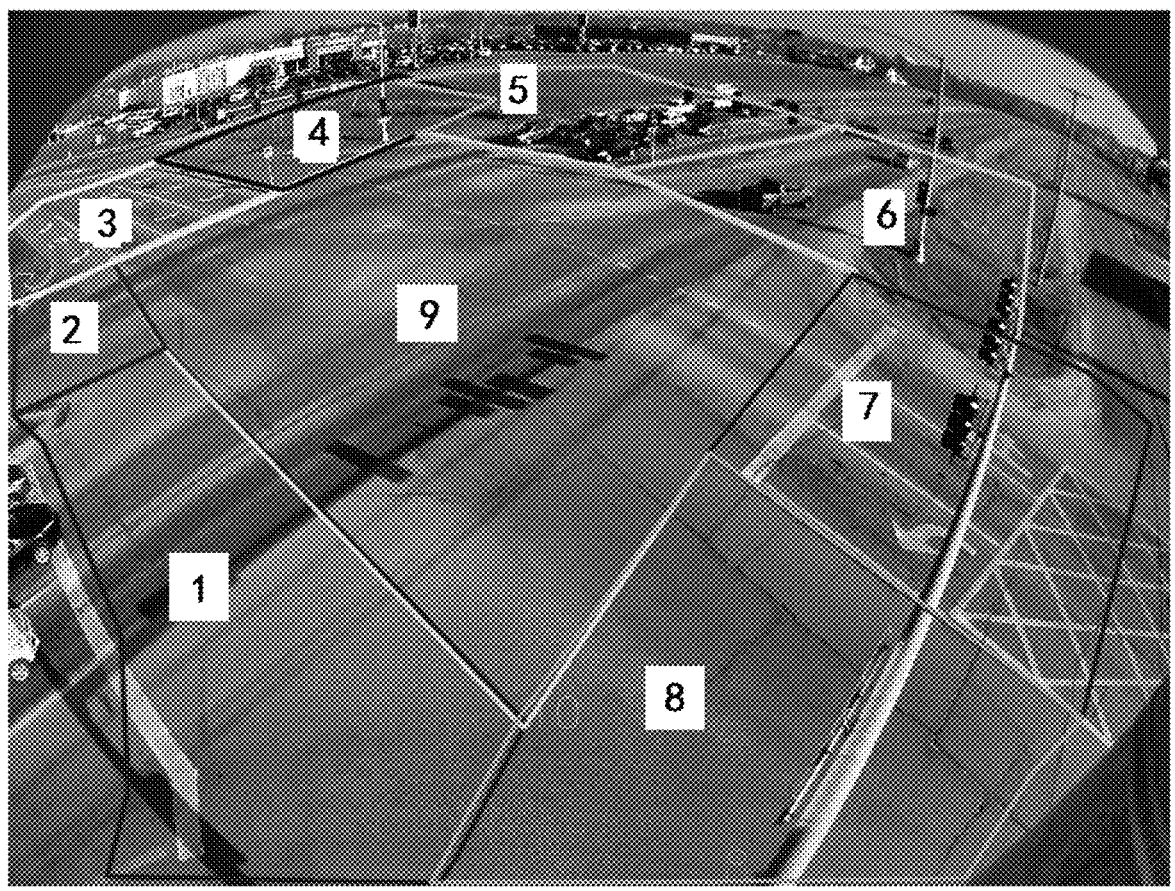
FIG. 4 is a schematic diagram of an acquisition region according to an embodiment of the present disclosure.

FIG. 4 is a schematic diagram of an acquisition region according to an embodiment of the present disclosure. As shown in FIG. 4, in some embodiments, the acquisition region (camera scene) may be divided into the following 9 regions: a region at the lower left corner in the figure is region 1, regions 2, 3, 4, 5, 6, 7 and 8 are sequentially arranged in the clockwise direction, and the middle region is region 9. When a region where the tracking trajectory of the target ends is region 2, the target is considered to go to an intersection on the left of this intersection. When the region where the tracking trajectory of the target ends is region 6, the target is considered to go to an intersection on the right of this intersection.

In some embodiments, the acquisition region may be divided into 5 regions as follows: 1+2=west, 3+4=north, 5+6=east, 7+8=south, 9=middle. That is, 9 regions can be reduced to 5 regions. When the tracking trajectory of a target ends at west and enters form east of an adjacent acquisition region, the target can be considered to go to west according to relative time sequence. Otherwise, the target is considered to go to east.

In some embodiments, assuming that the second acquisition region is the intersection adjacent to and on the left side of the first acquisition region, the target leaving from region 2 of in the first acquisition region (the region where the tracking trajectory ends is region 2 in the first acquisition region) will enter from region 5 of the second acquisition region (the region where the tracking trajectory starts is region 5 in the second acquisition region). Further, a target which leaves from region 6 in the second acquisition region (the region where the tracking trajectory end is region 6 in the second acquisition region) will enters from region 1 in the first acquisition region (the region where the tracking trajectory starts is region 2 in the first acquisition region). In this way, the first spatial group and the second spatial group may be determined.

In some embodiments, the first spatial group includes targets entering the second acquisition region from the first acquisition region, and the second spatial group includes targets entering the first acquisition region from the second acquisition region.

Thus, each group of two adjacent acquisition regions in the plurality of acquisition regions are processed, and a plurality of spatial groups can be obtained. Each spatial group includes at least one target and tracking trajectories of the target. In a case where an acquisition region has a plurality of acquisition regions adjacent to the acquisition region in different directions, the targets of the acquisition region may be divided into a plurality of spatial groups. For example, the acquisition region corresponds to the intersection in FIG. 4, there may be acquisition regions adjacent to this acquisition region in four directions, with a first spatial group and a second spatial group in each direction, corresponding to a total of 8 spatial groups. Targets in the acquisition region may also be repeatedly grouped into different spatial groups. The number of the specific spatial groups and the specific grouping manner of the target are not limited by the present disclosure.

In this way, through grouping in terms of the spatial correlation among the tracking trajectories, the tracking trajectories without spatial correlation can be filtered out, so that the success rate of cross-camera tracking matching can be improved.

In some embodiments, in step S17, for any one spatial group, the targets in the spatial group are grouped according to the start moment and the end moment of the tracking trajectory of the target in the spatial group and the range of duration for passing through the region between the acquisition regions where the targets are located, to obtain the plurality of temporal sub-groups.

That is, each tracking trajectory may be further filtered by the temporal correlation among the tracking trajectories. The start moment and the end moment of the tracking trajectory may be determined according to time stamps of a start video frame and an end video frame in the tracking trajectory of the target.

In some embodiments, prior to step S17, the method may further include:
Determining a range of duration for passing through a region between the first acquisition region and the second acquisition region, according to a distance between the first acquisition region and the second acquisition region, a maximum speed limit, a minimum speed limit and an average speed of vehicle.

That is to say, the duration required by the target from the first acquisition region to the second acquisition region, or from the second acquisition region to the first acquisition region, which is called as a range of duration for passing through, that is, a range from a minimum time tn_min to a maximum time tn_max for passing through the distance, may be calculated, according to the distance dn between the first acquisition region and the second acquisition region adjacent to each other, the maximum speed limit, the minimum speed limit, and the average speed of vehicle vn from the first acquisition region to the second acquisition region.

For example, if the distance between the first acquisition region and the second acquisition region is 1.5 km, the maximum speed limit is 90 km/h, the minimum speed limit is 30 km/h, and the average speed of vehicle is 60 km/h, the duration for passing through may be calculated to be 1 minute, 3 minutes, and 1.5 minutes, respectively. In this case, the range of duration for passing through may be set to be greater than or equal to 1 minute and less than or equal to 3 minutes.

In some embodiments, step S17 may include:
For the first spatial group corresponding to the first acquisition region and the second acquisition region, grouping corresponding targets into a same temporal sub-group, if the end moment of the tracking trajectory of the target in the first acquisition region is before the start moment of the tracking trajectory of the target in the second acquisition region, and a duration between the end moment and the start moment is within the range of duration for passing through.

That is to say, for the first spatial group of targets entering the second acquisition region from the first acquisition region, if the end moment of the tracking trajectory of the target in the first acquisition region is before the start moment of the tracking trajectory of the target in the second acquisition region, and the duration between the end moment and the start moment is within the range of duration for passing through, the corresponding targets may be the same target, and may be classified into the same temporal sub-group for subsequent clustering.

On the contrary, if the end moment of the tracking trajectory of the target in the first acquisition region is after the start moment of the tracking trajectory of the target in the second acquisition region, or the duration between the end moment and the start moment is not within the range of duration for passing through, the corresponding targets cannot be the same target, and are not classified into the same temporal sub-group.

In some embodiments, for the first spatial group of targets entering the first acquisition region from the second acquisition region, a similar method is used to determine whether the targets are classified into a same temporal sub-group.

In this way, each tracking trajectory can be further filtered in terms of the temporal correlation among the tracking trajectories, so that the range of subsequent clustering is further narrowed, and the error rate of matching is reduced.

In some embodiments, in step S18, the tracking trajectories of the targets in the respective temporal sub-group may be clustered, to obtain the trajectory matching result of the spatial group, where the trajectory matching result includes tracking trajectories belonging to the same target in video streams of different acquisition regions.

In some embodiments, the clustering manner may be hierarchical clustering, where step S18 includes: clustering the tracking trajectories of the targets in the respective temporal sub-group with a hierarchical clustering, to obtain the trajectory matching result of the spatial group.

It should be understood that, one of ordinary skill in the art may set the clustering manner according to actual situations, for example, a K-means clustering may alternatively be employed. The specific clustering manner is not limited by the present disclosure.

In some embodiments, in step S19, the trajectory matching result of the video streams of the plurality of acquisition regions may be determined, according to the trajectory matching results of all of the plurality of spatial groups. Thus, the whole processing process of target matching of plurality of cameras is realized.

In this way, the tracking trajectories of the targets are filtered in terms of spatial and temporal conditions (spatial correlation and temporal correlation) in the target matching of the plurality of cameras, and most of the tracking trajectories unmatched can be filtered, so that the accuracy of hierarchical clustering is greatly improved, the accuracy of cross-camera multi-target tracking is improved, and the technical problem of low accuracy of the cross-camera multi-target tracking is solved.

Figure 5:
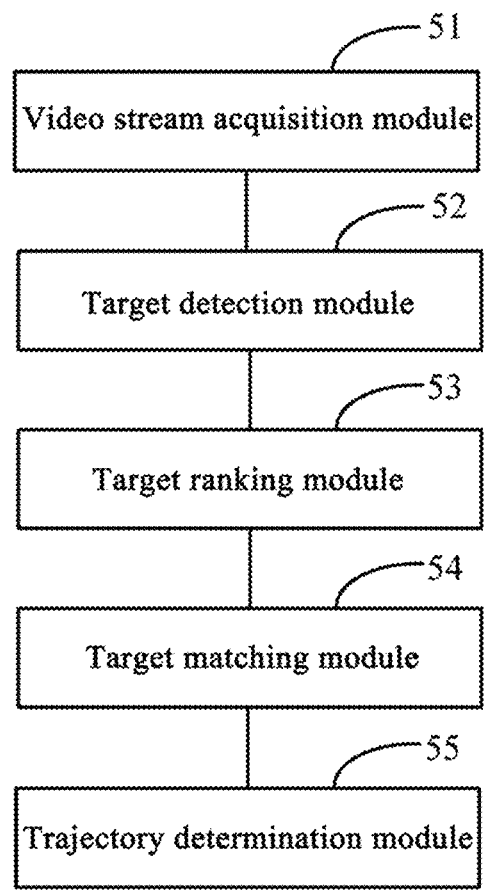
FIG. 5 is a block diagram of a target tracking apparatus according to an embodiment of the present disclosure.

According to an embodiment of the present disclosure, a target tracking apparatus is further provided. FIG. 5 is a block diagram of a target tracking apparatus according to an embodiment of the present disclosure. As shown in FIG. 5, the apparatus includes:

A video stream acquisition module 51, configured to acquire a video stream of a preset acquisition region;

A target detection module 52, configured to perform target detection on a $t^{th}$ video frame of the video stream, and determine a first candidate box of at least one candidate target in the $t^{th}$ video frame, where t is an integer and $1 < t \leq T$, and T is the number of video frames of the video stream;

A target ranking module 53, configured to rank the candidate at least one target, according to a confidence of each of the at least one candidate target and a first intersection over union between the first candidate boxes of respective candidate targets, and determine a candidate target in at least one matched rank;

A target matching module 54, configured to perform at least one matching on the candidate target in the at least one matched rank, respectively, according to a set of trackers of the video stream in a $(t-1)^{th}$ state and a preset matching strategy, and determine a target tracking result of the $t^{th}$ video frame; where the target tracking result includes an identifier and a position of the target in the $t^{th}$ video frame; and A trajectory determination module 55, configured to determine a tracking trajectory of the target in the video stream according to the target tracking result of the T number of video frames of the video stream, where the tracking trajectory includes video frames corresponding to the target and positions of the target in the video frames.

In some embodiments, for any candidate target, the target ranking module is configured for:

Determining the candidate target as a first candidate target in a first matched rank, if the confidence of the candidate target is greater than or equal to a first confidence threshold and a maximum value of the first intersection over union of the candidate target is less than or equal to a first intersection over union threshold; determining the candidate target as a second candidate target in a second matched rank, if the confidence of the candidate target is less than the first confidence threshold and greater than or equal to a second confidence threshold, and the maximum value of the first intersection over union of the candidate target is less than or equal to the first intersection over union threshold; and determining the candidate target as a third candidate target in a third matched rank, if the confidence of the candidate target is less than the first confidence threshold and greater than or equal to the second confidence threshold, and the maximum value of the first intersection over union of the candidate target is greater than the first intersection over union threshold and less than or equal to a second intersection over union threshold, where the first confidence threshold is greater than the second confidence threshold, and the first intersection over union threshold is less than the second intersection over union threshold.

In some embodiments, the set of trackers in the $(t-1)^{th}$ state for the video stream includes at least one of a first tracker of a first history target matched in a $(t-1)^{th}$ video frame and a second tracker of a second history target unmatched in the $(t-1)^{th}$ video frame, where the tracker includes an identifier, a position and feature information, a single-target prediction mode and a prediction parameter of the tracked target.

The target matching module is configured for:

Performing feature extraction on the first candidate target, to obtain first feature information of the first candidate target; determining a first prediction box of the first history target in the $t^{th}$ video frame with a corresponding single-target prediction mode, according to the first tracker of the first history target; determining a first loss matrix between the first history target and the first candidate target, according to the first feature information of the first candidate target, the first candidate box of the first candidate target, and the first prediction box of the first history target in the $t^{th}$ video frame; determining a first matching result between the first history target and the first candidate target according to the first loss matrix, where the first matching result includes at least one of the first candidate target in the first matched rank that is matched, the first candidate target in the first matched rank that is unmatched, and the first history target that is unmatched; and for the first candidate target matched in the first matching result, determining the first candidate target as the target in the $t^{th}$ video frame, where an identifier of the target is an identifier of the first history target matched with the target, and a position of the target is a position of the first candidate box of the target.

In some embodiments, the determining a first loss matrix between the first history target and the first candidate target, according to the first feature information of the first candidate target, the first candidate box of the first candidate target, and the first prediction box of the first history target in the $t^{th}$ video frame includes: determining a first feature distance matrix according to first feature information of the first candidate target and the feature information of the first history target; determining a first intersection over union distance matrix according to the first candidate box of the first candidate target and the first prediction box of the first history target in the $t^{th}$ video frame; and determining the first loss matrix, according to the first feature distance matrix and the first intersection over union distance matrix.

In some embodiments, the prediction mode of the first history target includes at least one single-target prediction mode, and the first intersection over union distance matrix correspondingly includes at least one intersection over union distance matrix.

In some embodiments, the target matching module is further configured for:

Determining a second prediction box of the third history target in the $t^{th}$ video frame, through predicting with a Kalman prediction model, according to a prediction parameter of a third history target, where the third history target is the first history target unmatched in the first matching result; determining a second intersection over union distance matrix according to a first candidate box of a fourth candidate target and the second prediction box of the third history target, where the fourth candidate target is the first candidate target unmatched in the first matching result; determining a third intersection over union distance matrix according to the first candidate box of the fourth candidate target and the first prediction box of the third history target in the $t^{th}$ video frame; determining a second loss matrix according to the second intersection over union distance matrix and the third intersection over union distance matrix; determining a second matching result between the fourth candidate target and the third history target according to the second loss matrix, where the second matching result includes at least one of the fourth candidate target that is matched, the fourth candidate target that is unmatched, and the third history target that is unmatched; and for the fourth candidate target matched in the second matching result, determining the fourth candidate target as the target in the $t^{th}$ video frame, where an identifier of the target is an identifier of the matched third history target, and a position of the target is a position of the first candidate box of the target.

In some embodiments, the target matching module is further configured for:

Determining a second feature distance matrix according to a first feature information of a fifth candidate target and the feature information of the second history target, where the fifth candidate target is the fourth candidate target unmatched in the second matching result; determining a third matching result between the fifth candidate target and the second history target, according to the second feature distance matrix, where the third matching result includes at least one of the fifth candidate target matched, the fifth candidate target unmatched, and the second history target unmatched; and for the fifth candidate target matched in the third matching result, determining the fifth candidate target as the target in the $t^{th}$ video frame, where an identifier of the target is an identifier of the second history target matched with the target, and a position of the target is a position of the first candidate box of the target.

In some embodiments, the target matching module is further configured for:

Determining a third prediction box of a fourth history target in the $t^{th}$ video frame, through predicting with a Kalman prediction model, according to a prediction parameter of the fourth history target, where the fourth history target includes the third history target unmatched in the second matching result and the second history target unmatched in the third matching result; determining a fourth prediction box of the fourth history target in the $t^{th}$ video frame, according to the single-target prediction mode of the fourth history target; determining a third loss matrix according to the first candidate box of a sixth candidate target and the third prediction box and the fourth prediction box of the fourth history target, where the sixth candidate target includes the second candidate target and the third candidate target; determining a fourth matching result between the sixth candidate target and the fourth history target according to the third loss matrix, where the fourth matching result includes at least one of the sixth candidate target matched, the sixth candidate target unmatched, and the fourth history target unmatched; and for the sixth candidate target matched in the fourth matching result, determining the sixth candidate target as the target in the $t^{th}$ video frame, where an identifier of the target is an identifier of the fourth history target matched, and a position of the target is a position of the first candidate box of the target.

In some embodiments, the target matching module is further configured for:

For the fifth candidate target unmatched in the third matching result, determining the fifth candidate target as the target in the $t^{th}$ video frame, where an identifier of the target is a newly created identifier, and a position of the target is a position of the first candidate box of the target.

After determining the target tracking result of the $t^{th}$ video frame, the apparatus further includes a creating module, configured to create a first tracker of the target in the set of trackers, where the first tracker of the target includes the identifier, the position and the feature information, the single-target prediction mode, and the prediction parameters of the target.

In some embodiments, after the determining the target tracking result of the $t^{th}$ video frame, the apparatus further includes: a determination module, configured to determine a seventh candidate target, where the seventh candidate target includes the first candidate target matched in the first matching result, the fourth candidate target matched in the second matching result, the fifth candidate target matched in the third matching result, and the sixth candidate target matched in the fourth matching result; and an updating module, configured to update the tracker of the seventh candidate target according to the position of the seventh candidate target.

In some embodiments, the updating module is configured for:

Updating the prediction parameter of a Kalman prediction model in the tracker of the seventh candidate target according to the position of the seventh candidate target; for a single-target prediction mode of the seventh candidate target, determining a second intersection over union between the candidate box of the seventh candidate target and a prediction box determined with the single-target prediction mode; initializing the prediction parameter corresponding to the single-target prediction mode, if the second intersection over union is greater than the third intersection over union threshold; and updating the prediction parameter corresponding to the single-target prediction mode according to the position of the seventh candidate target, if the second intersection over union is less than or equal to the third intersection over union threshold.

In some embodiments, the updating module is further configured for:

For the first candidate target in the seventh candidate targets, updating the feature information in the tracker of the first candidate target according to the first feature information of the first candidate target; performing feature extraction on the second candidate target in the seventh candidate targets to obtain second feature information of the second candidate target; and updating the feature information in the tracker of the second candidate target, according to the second feature information.

In some embodiments, after the determining the target tracking result of the $t^{th}$ video frames, the apparatus further includes a parameter updating module, configured to update the prediction parameter of the Kalman prediction model in the tracker of the fourth history target according to the position of the fourth prediction box of the fourth history target, for the fourth history target unmatched in the fourth matching result.

In some embodiments, the video stream includes a video stream of a plurality of acquisition regions, and after the determining the tracked trajectory of the target in the video stream, the apparatus further includes:

A spatial grouping module, configured to group the targets in terms of the spatial correlation among the tracking trajectories, according to the geographic locations of the plurality of acquisition regions and the tracking trajectories of the target in the video streams of the plurality of acquisition regions, to obtain a plurality of spatial groups, where each of the plurality of spatial groups includes at least one target and the tracking trajectories of the target; a temporal grouping module, configured to group the targets in the spatial group, for any one spatial group, according to a start moment and an end moment of the tracking trajectory of the target in the spatial group and a range of duration for passing through a region between the acquisition regions where the target is located, to obtain a plurality of temporal sub-groups; a clustering module configured to cluster the tracking trajectories of the targets in a respective temporal sub-group, to obtain a trajectory matching result of the spatial group, where the trajectory matching result includes the tracking trajectories belonging to a same target in video streams of different acquisition regions; and a trajectory matching module configured to determine a trajectory matching result of the video streams of the plurality of acquisition regions, according to the trajectory matching results of the plurality of spatial groups.

In some embodiments, the spatial grouping module is configured for:

Determining a first spatial group and a second spatial group, according to geographic locations of a first acquisition region and a second acquisition region and tracking trajectories of targets in video streams of the first acquisition region and the second acquisition region, where the first acquisition region and the second acquisition region are any two adjacent acquisition regions of the plurality of acquisition regions; and the first spatial group includes targets entering the second acquisition region from the first acquisition region, and the second spatial group includes targets entering the first acquisition region from the second acquisition region.

In some embodiments, before grouping the targets in the spatial group, to obtain a plurality of temporal sub-groups, the apparatus further includes a duration determination module, configured to determine a range of duration for passing through a region between the first acquisition region and the second acquisition region, according to a distance between the first acquisition region and the second acquisition region, a maximum speed limit, a minimum speed limit and an average speed of vehicle.

The temporal grouping module is configured for: for the first spatial group corresponding to the first acquisition region and the second acquisition region, grouping corresponding targets into a same temporal sub-group, if the end moment of the tracking trajectory of the target in the first acquisition region is before the start moment of the tracking trajectory of the target in the second acquisition region, and a duration between the end moment and the start moment is within the range of duration for passing through.

In some embodiments, the clustering module is configured for: clustering the tracking trajectories of the targets in the respective temporal sub-group with a hierarchical clustering, to obtain the trajectory matching result of the spatial group.

Figure 6:
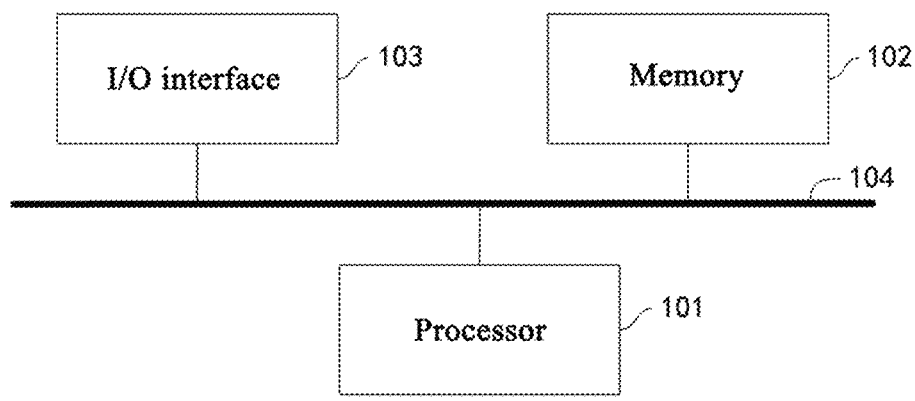
FIG. 6 is a schematic diagram illustrating a structure of an electronic device according to an embodiment of the present disclosure.

FIG. 6 is a schematic structural diagram of an electronic device according to an embodiment of the present disclosure. As shown in FIG. 6, an embodiment of the present disclosure provides an electronic device including one or more processors 101, a memory 102, and one or more I/O interfaces 103. The memory 102 stores one or more programs that, when executed by the one or more processors, cause the one or more processors to implement the target tracking method in any one of the above embodiments. The one or more I/O interfaces 103 are coupled between the processor and the memory, and are configured to enable information interaction between the processor and the memory.

The processor 101 is a device with data processing capability, which includes but is not limited to a central processing unit (CPU), or the like. The memory 102 is a device having data storage capabilities including, but not limited to, random access memory (RAM, more specifically SDRAM, DDR, etc.), read only memory (ROM), electrically erasable programmable read only memory (EEPROM), flash memory (FLASH). The I/O interface (read/write interface) 103 coupled between the processor 101 and the memory 102 may enable information interaction between the processor 101 and the memory 102, which may include, but is not limited to, a data bus (Bus), or the like.

In some embodiments, the processor 101, the memory 102, and the I/O interface 103 are connected to each other through a bus, and in turn to other components of the computing device.

According to an embodiment of the present disclosure, a non-transitory computer readable medium is further provided. The non-transitory computer readable medium stores thereon a computer program which, when being executed by a processor, implements steps in any one target tracking method in the above embodiments.

In particular, according to an embodiment of the present disclosure, the process described above with reference to the flow chart may be implemented as a computer software program. For example, an embodiment of the present disclosure includes a computer program product including a computer program carried on a machine readable medium, where the computer program includes program codes for performing the method illustrated by the flow chart. In such an embodiment, the computer program may be downloaded and installed from a network via a communication part, and/or installed from a removable medium. The above functions defined in the system of the present disclosure are performed when the computer program is performed by a Central Processing Unit (CPU).

It should be noted that the non-transitory computer readable medium shown in the present disclosure may be a computer readable signal medium, a computer readable storage medium, or any combination of the two. A computer readable storage medium may be, for example, but not limited to, an electronic, magnetic, optical, electromagnetic, infrared, or semiconductor system, apparatus, or device, or any combination thereof. More specific examples of the computer readable storage medium may include, but are not limited to, an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, a computer readable storage medium may be any tangible medium that contains or stores a program, which can be used by or in connection with an instruction execution system, apparatus, or device. In contrast, in the present disclosure, a computer readable signal medium may include a propagated data signal with computer readable program code carried therein, in a baseband or as a part of a carrier wave. Such a propagated data signal may take any of a variety of forms, including, but not limited to, electro-magnetic signal, optical signal, or any suitable combination thereof. A computer readable signal medium may also be any non-transitory computer readable medium other than a computer readable storage medium, which may transmit, propagate, or convey a program for use by or in connection with an instruction execution system, apparatus, or device. The program codes on the non-transitory computer readable medium may be conveyed by any appropriate medium, including but not limited to wireless, a wire, fiber optic cable, RF, etc., or any suitable combination thereof.

The flowchart and block diagram in the figures illustrate an architecture, functionality, and operation possibly implemented by the system, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the function noted in the block may occur in a different order from that noted in the figures. For example, two blocks shown in succession may, in fact, be executed substantially concurrently, or the blocks may sometimes be executed in a reverse order, depending upon the functionality involved. It should also be noted that each block in the block diagram and/or the flowchart, and combinations of blocks in the block diagram and/or the flowchart, may be implemented by a special purpose hardware-based system that performs the specified function or act, or by a combination of a special purpose hardware and computer instructions.

A circuit or sub-circuit described in the embodiment of the present disclosure may be implemented by a software or a hardware. The described circuit or sub-circuit may alternatively be arranged in a processor, for example, may be described as: a processor, including a receiving circuit and a processing circuit, where the processing circuit includes a writing sub-circuit and a reading sub-circuit. The designation of such circuit or sub-circuit does not in some cases constitute a limitation on the circuit or sub-circuit itself, for example, the receiving circuit may alternatively be described as "receiving a video signal".

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A method of tracking a target, comprising:

acquiring a video stream of a preset acquisition region;

performing a target detection on a $t^{th}$ video frame of the video stream, and determining a first candidate box of at least one candidate target in the $t^{th}$ video frame, wherein t is an integer and $1<t\leq T$, and T is the number of video frames of the video stream;

ranking the at least one candidate target, according to a confidence of each of the at least one candidate target and a first intersection over union between the first candidate boxes of respective candidate targets, and determining a candidate target in at least one matched rank;

performing at least one matching on the candidate target in the at least one matched rank, respectively, according to a set of trackers of the video stream in a $(t-1)^{th}$ state and a preset matching strategy, and determining a target tracking result of the $t^{th}$ video frame, wherein the target tracking result comprises an identifier and a position of a target in the $t^{th}$ video frame; and determining a tracking trajectory of the target in the video stream according to the target tracking results of the T number of video frames of the video stream, wherein the tracking trajectory comprises video frames corresponding to the target and positions of the target in the video frames, wherein for any one of the at least one candidate target, the ranking the at least one candidate target, according to a confidence of each of the at least one candidate target and a first intersection over union between the first candidate boxes of respective candidate targets, comprises:

determining the candidate target as a first candidate target in a first matched rank, if the confidence of the candidate target is greater than or equal to a first confidence threshold and a maximum value of the first intersection over unions between the candidate target and other candidate targets is less than or equal to a first intersection over union threshold;

determining the candidate target as a second candidate target in a second matched rank, if the confidence of the candidate target is less than the first confidence threshold and greater than or equal to a second confidence threshold, and the maximum value of the first intersection over unions between the candidate target and other candidate targets is less than or equal to the first intersection over union threshold; and determining the candidate target as a third candidate target in a third matched rank, if the confidence of the candidate target is less than the first confidence threshold and greater than or equal to the second confidence threshold, and the maximum value of the first intersection over unions between the candidate target and other candidate targets is greater than the first intersection over union threshold and less than or equal to a second intersection over union threshold, wherein the first confidence threshold is greater than the second confidence threshold, and the first intersection over union threshold is less than the second intersection over union threshold, wherein the set of trackers in the $(t-1)^{th}$ state for the video stream comprises at least one of a first tracker of a first history target matched in a $(t-1)^{th}$ video frame and a second tracker of a second history target unmatched in the $(t-1)^{th}$ video frame, wherein each of the set of trackers comprises an identifier, a position, feature information, a single-target prediction mode and a prediction parameter of a tracked target, wherein the performing the at least one matching on the candidate target in the at least one matched rank, respectively, according to the set of trackers of the video stream in the $(t-1)^{th}$ state and the preset matching strategy, and determining the target tracking result of the $t^{th}$ video frame, comprises:

performing a feature extraction on the first candidate target, to obtain first feature information of the first candidate target;

determining a first prediction box of the first history target in the $t^{th}$ video frame with a corresponding single-target prediction mode, according to the first tracker of the first history target;

determining a first loss matrix between the first history target and the first candidate target, according to the first feature information of the first candidate target, the first candidate box of the first candidate target, and the first prediction box of the first history target in the $t^{th}$ video frame;

determining a first matching result between the first history target and the first candidate target according to the first loss matrix, wherein the first matching result comprises at least one of the first candidate target in the first matched rank that is matched, the first candidate target in the first matched rank that is unmatched, and the first history target that is unmatched; and for the first candidate target matched in the first matching result, determining the first candidate target as a target in the $t^{th}$ video frame, wherein an identifier of the target is an identifier of the first history target matched with the target, and a position of the target is a position of the first candidate box of the target.

2. The method according to claim 1, wherein the determining the first loss matrix between the first history target and the first candidate target, according to the first feature information of the first candidate target, the first candidate box of the first candidate target, and the first prediction box of the first history target in the $t^{th}$ video frame, comprises:
determining a first feature distance matrix according to the first feature information of the first candidate target and the feature information of the first history target;
determining a first intersection over union distance matrix according to the first candidate box of the first candidate target and the first prediction box of the first history target in the $t^{th}$ video frame; and
determining the first loss matrix, according to the first feature distance matrix and the first intersection over union distance matrix.

3. The method according to claim 2, wherein a prediction mode of the first history target comprises at least one single-target prediction mode, and the first intersection over union distance matrix correspondingly comprises at least one intersection over union distance matrix.

4. The method according to claim 1, wherein the performing the at least one matching on the candidate target in the at least one matched rank, respectively, according to the set of trackers of the video stream in the $(t-1)^{th}$ state and the preset matching strategy, and determining the target tracking result of the $t^{th}$ video frame, further comprises:
determining a second prediction box of a third history target in the $t^{th}$ video frame, through predicting with a Kalman prediction model, according to a prediction parameter of the third history target, wherein the third history target is the first history target unmatched in the first matching result;
determining a second intersection over union distance matrix according to a first candidate box of a fourth candidate target and the second prediction box of the third history target, wherein the fourth candidate target is the first candidate target unmatched in the first matching result;
determining a third intersection over union distance matrix according to the first candidate box of the fourth candidate target and the first prediction box of the third history target in the $t^{th}$ video frame;
determining a second loss matrix according to the second intersection over union distance matrix and the third intersection over union distance matrix;
determining a second matching result between the fourth candidate target and the third history target according to the second loss matrix, wherein the second matching result comprises at least one of the fourth candidate target that is matched, the fourth candidate target that is unmatched, and the third history target that is unmatched; and
for the fourth candidate target matched in the second matching result, determining the fourth candidate target as a target in the $t^{th}$ video frame, wherein the identifier of the target is an identifier of the third history target matched with the target, and the position of the target is the position of the first candidate box of the target.

5. The method according to claim 4, wherein the performing the at least one matching on the candidate target in the at least one matched rank, respectively, according to the set of trackers of the video stream in the $(t-1)^{th}$ state and the preset matching strategy, and determining the target tracking result of the $t^{th}$ video frame, further comprises:
determining a second feature distance matrix according to first feature information of a fifth candidate target and the feature information of the second history target, wherein the fifth candidate target is the fourth candidate target unmatched in the second matching result;
determining a third matching result between the fifth candidate target and the second history target, according to the second feature distance matrix, wherein the third matching result comprises at least one of the fifth candidate target matched, the fifth candidate target unmatched, and the second history target unmatched; and
for the fifth candidate target matched in the third matching result, determining the fifth candidate target as a target in the $t^{th}$ video frame,
wherein the identifier of the target is an identifier of the second history target matched with the target, and the position of the target is the position of the first candidate box of the target.

6. The method according to claim 5, wherein the performing the at least one matching on the candidate target in the at least one matched rank, respectively, according to the set of the trackers of the video stream in the $(t-1)^{th}$ state and the preset matching strategy, and determining the target tracking result of the $t^{th}$ video frame, further comprises:
determining a third prediction box of a fourth history target in the $t^{th}$ video frame, through predicting with a Kalman prediction model, according to a prediction parameter of the fourth history target, wherein the fourth history target comprises the third history target unmatched in the second matching result and the second history target unmatched in the third matching result;
determining a fourth prediction box of the fourth history target in the $t^{th}$ video frame, according to the single-target prediction mode of the fourth history target;
determining a third loss matrix according to the first candidate box of a sixth candidate target and the third prediction box and the fourth prediction box of the fourth history target, wherein the sixth candidate target comprises the second candidate target and the third candidate target;
determining a fourth matching result between the sixth candidate target and the fourth history target according to the third loss matrix, wherein the fourth matching result comprises at least one of the sixth candidate target matched, the sixth candidate target unmatched, and the fourth history target unmatched; and
for the sixth candidate target matched in the fourth matching result, determining the sixth candidate target as a target in the $t^{th}$ video frame, wherein the identifier of the target is an identifier of the fourth history target matched with the target, and the position of the target is the position of the first candidate box of the target.

7. The method according to claim 6, wherein subsequent to the determining the target tracking result of the $t^{th}$ video frame, the method further comprises:
determining a seventh candidate target, wherein the seventh candidate target comprises the first candidate target matched in the first matching result, the fourth candidate target matched in the second matching result, the fifth candidate target matched in the third matching result, and the sixth candidate target matched in the fourth matching result; and
updating a tracker of the seventh candidate target according to a position of the seventh candidate target.

8. The method according to claim 7, wherein the updating the tracker of the seventh candidate target according to the position of the seventh candidate target, comprises:
   updating a prediction parameter of a Kalman prediction model in the tracker of the seventh candidate target according to the position of the seventh candidate target;
   for a single-target prediction mode of the seventh candidate target, determining a second intersection over union between the candidate box of the seventh candidate target and a prediction box determined with the single-target prediction mode;
   initializing a prediction parameter corresponding to the single-target prediction mode, if the second intersection over union is greater than the third intersection over union threshold; and
   updating the prediction parameter corresponding to the single-target prediction mode according to the position of the seventh candidate target, if the second intersection over union is less than or equal to the third intersection over union threshold.

9. The method according to claim 8, wherein the updating the tracker of the seventh candidate target according to the position of the seventh candidate target, further comprises:
   for the first candidate target in the seventh candidate target, updating the feature information in the tracker of the first candidate target according to the first feature information of the first candidate target;
   performing feature extraction on the second candidate target in the seventh candidate targets to obtain second feature information of the second candidate target; and
   updating the feature information in the tracker of the second candidate target, according to the second feature information.

10. The method according to claim 6, wherein subsequent to the determining the target tracking result of the $t^{th}$ video frame, the method further comprises:
   for the fourth history target unmatched in the fourth matching result, updating the prediction parameter of the Kalman prediction model in the tracker of the fourth history target according to the position of the fourth prediction box of the fourth history target.

11. The method according to claim 5, wherein the performing the at least one matching on the candidate target in the at least one matched rank, respectively, according to the set of trackers of the video stream in the $(t-1)^{th}$ state and the preset matching strategy, and determining the target tracking result of the $t^{th}$ video frame, further comprises:
   for the fifth candidate target unmatched in the third matching result, determining the fifth candidate target as a target in the $t^{th}$ video frame, wherein an identifier of this target is a newly created identifier, and the position of the target is the position of the first candidate box of the target;
   wherein subsequent to the determining the target tracking result of the $t^{th}$ video frame, the method further comprises:
   creating a first tracker of the target in the set of trackers, wherein the first tracker of the target comprises the identifier, the position, the feature information, the single-target prediction mode, and the prediction parameter of the target.

12. The method according to claim 1, wherein the video stream comprises a video stream of a plurality of acquisition regions, and subsequent to the determining the tracking trajectory of the target in the video stream, the method further comprises:
   grouping the targets in terms of the spatial correlation among the tracking trajectories, according to the geographic locations of the plurality of acquisition regions and the tracking trajectories of the targets in the video streams of the plurality of acquisition regions, to obtain a plurality of spatial groups, wherein each of the plurality of spatial groups comprises at least one target and the tracking trajectories of the target;
   for any one of the plurality of spatial groups, grouping the targets in the spatial group, according to a start moment and an end moment of the tracking trajectory of the target in the spatial group and a range of duration for passing through a region between the acquisition regions where the target is located, to obtain a plurality of temporal sub-groups;
   clustering the tracking trajectories of the targets in a respective temporal sub-group, to obtain a trajectory matching result of the spatial group, wherein the trajectory matching result comprises the tracking trajectories belonging to a same target in video streams of different acquisition regions; and
   determining a trajectory matching result of the video streams of the plurality of acquisition regions, according to the trajectory matching results of the plurality of spatial groups.

13. The method according to claim 12, wherein the grouping the targets in terms of the spatial correlation among the tracking trajectories, according to the geographic locations of the plurality of acquisition regions and the tracking trajectories of the target in the video streams of the plurality of acquisition regions, to obtain a plurality of spatial groups, comprises:
   determining a first spatial group and a second spatial group, according to geographic locations of a first acquisition region and a second acquisition region and tracking trajectories of targets in video streams of the first acquisition region and the second acquisition region;
   wherein the first acquisition region and the second acquisition region are any two adjacent acquisition regions of the plurality of acquisition regions, and
   the first spatial group comprises targets entering the second acquisition region from the first acquisition region, and the second spatial group comprises targets entering the first acquisition region from the second acquisition region.

14. The method according to claim 13, wherein prior to the grouping the targets in the spatial group, to obtain the plurality of temporal sub-groups, the method further comprises:
   determining a range of duration for passing through a region between the first acquisition region and the second acquisition region, according to a distance between the first acquisition region and the second acquisition region, a maximum speed limit, a minimum speed limit and an average speed of vehicle;
   wherein for any one of the plurality of spatial groups, the grouping the targets in the spatial group, according to a start moment and an end moment of the tracking trajectory of the target in the spatial group and a range of duration for passing through a region between the acquisition regions where the target is located, to obtain the plurality of temporal sub-groups, comprises:
   for the first spatial group corresponding to the first acquisition region and the second acquisition region, grouping corresponding targets into a same temporal sub-group, if the end moment of the tracking trajectory of the target in the first acquisition region is before the start moment of the tracking trajectory of the target in the second acquisition region, and a duration between the end moment and the start moment is within the range of duration for passing through.

15. The method according to claim 12, wherein the clustering the tracking trajectories of the targets in a respective temporal sub-group, to obtain a trajectory matching result of the spatial group, comprises:
    clustering the tracking trajectories of the targets in the respective temporal sub-group with a hierarchical clustering, to obtain the trajectory matching result of the spatial group.

16. An electronic device, comprising:
    one or more processors; and
    a memory for storing one or more programs which, when being executed by the one or more processors, cause the one or more processors to implement the method according to claim 1.

17. A non-transitory computer readable storage medium storing a computer program which, when being executed by a processor, implements the method of tracking a target according to claim 1.

18. A target tracking apparatus, comprising:
    a video stream acquisition module, configured to acquire a video stream of a preset acquisition region;
    a target detection module, configured to perform a target detection on a $t^{th}$ video frame of the video stream, and determine a first candidate box of at least one candidate target in the $t^{th}$ video frame, wherein t is an integer and $1<t\le T$, and T is the number of video frames of the video stream;
    a target ranking module, configured to rank the at least one candidate target, according to a confidence of each of the at least one candidate target and a first intersection over union between the first candidate boxes of respective candidate targets, and determine a candidate target in at least one matched rank;
    a target matching module, configured to perform at least one matching on the candidate target in the at least one matched rank, respectively, according to a set of trackers of the video stream in a $(t-1)^{th}$ state and a preset matching strategy, and determine a target tracking result of the $t^{th}$ video frame; wherein the target tracking result comprises an identifier and a position of a target in the $t^{th}$ video frame; and
    a trajectory determination module, configured to determine a tracking trajectory of the target in the video stream according to the target tracking result of the T number of video frames of the video stream, wherein the tracking trajectory comprises video frames corresponding to the target and positions of the target in the video frames,
    wherein for any one of the at least one candidate target, the target ranking module is configured to:
    determine the candidate target as a first candidate target in a first matched rank, if the confidence of the candidate target is greater than or equal to a first confidence threshold and a maximum value of the first intersection over unions between the candidate target and other candidate targets is less than or equal to a first intersection over union threshold;
    determine the candidate target as a second candidate target in a second matched rank, if the confidence of the candidate target is less than the first confidence threshold and greater than or equal to a second confidence threshold, and the maximum value of the first intersection over unions between the candidate target and other candidate targets is less than or equal to the first intersection over union threshold; and
    determine the candidate target as a third candidate target in a third matched rank, if the confidence of the candidate target is less than the first confidence threshold and greater than or equal to the second confidence threshold, and the maximum value of the first intersection over unions between the candidate target and other candidate targets is greater than the first intersection over union threshold and less than or equal to a second intersection over union threshold,
    wherein the first confidence threshold is greater than the second confidence threshold, and the first intersection over union threshold is less than the second intersection over union threshold,
    wherein the set of trackers in the $(t-1)^{th}$ state for the video stream comprises at least one of a first tracker of a first history target matched in a $(t-1)^{th}$ video frame and a second tracker of a second history target unmatched in the $(t-1)^{th}$ video frame, wherein each of the set of trackers comprises an identifier, a position, feature information, a single-target prediction mode and a prediction parameter of a tracked target,
    wherein the target matching module is configured to:
    perform a feature extraction on the first candidate target, to obtain first feature information of the first candidate target;
    determine a first prediction box of the first history target in the $t^{th}$ video frame with a corresponding single-target prediction mode, according to the first tracker of the first history target;
    determine a first loss matrix between the first history target and the first candidate target, according to the first feature information of the first candidate target, the first candidate box of the first candidate target, and the first prediction box of the first history target in the $t^{th}$ video frame;
    determine a first matching result between the first history target and the first candidate target according to the first loss matrix, wherein the first matching result comprises at least one of the first candidate target in the first matched rank that is matched, the first candidate target in the first matched rank that is unmatched, and the first history target that is unmatched; and
    for the first candidate target matched in the first matching result, determine the first candidate target as a target in the $t^{th}$ video frame, wherein an identifier of the target is an identifier of the first history target matched with the target, and a position of the target is a position of the first candidate box of the target.

* * * * *